(12) United States Patent
Ford

(10) Patent No.: US 10,935,133 B2
(45) Date of Patent: Mar. 2, 2021

(54) JOINTED PLUNGER ASSEMBLY AND METHOD THEREFOR

(71) Applicant: Michael Brent Ford, St. George, UT (US)

(72) Inventor: Michael Brent Ford, St. George, UT (US)

( * ) Notice: Subject to any disclaimer, the term of this patent is extended or adjusted under 35 U.S.C. 154(b) by 0 days.

(21) Appl. No.: 16/431,398

(22) Filed: Jun. 4, 2019

(65) Prior Publication Data

US 2019/0376600 A1 Dec. 12, 2019

Related U.S. Application Data

(60) Provisional application No. 62/681,954, filed on Jun. 7, 2018.

(51) Int. Cl.
*F16J 1/22* (2006.01)
*F16J 15/56* (2006.01)
*F04B 47/02* (2006.01)
*F04B 53/14* (2006.01)

(52) U.S. Cl.
CPC .............. *F16J 1/22* (2013.01); *F04B 47/026* (2013.01); *F04B 53/14* (2013.01); *F16J 15/56* (2013.01)

(58) Field of Classification Search
CPC .... F16J 1/22; F16J 15/56; F04B 47/02; F04B 47/026; F04B 53/148; F04B 53/14; F04B 53/144
See application file for complete search history.

(56) References Cited

U.S. PATENT DOCUMENTS

| | | | |
|---|---|---|---|
| 8,647,083 B2 | 2/2014 | Ford | |
| 9,145,765 B2 * | 9/2015 | Gabriel | ................... F16J 15/32 |
| 9,957,782 B1 * | 5/2018 | Ford | ...................... E21B 43/086 |
| 10,584,546 B1 * | 3/2020 | Ford | ........................ E21B 34/14 |
| 2018/0223636 A1 * | 8/2018 | Ford | ...................... E21B 43/126 |

* cited by examiner

*Primary Examiner* — Abiy Teka
(74) *Attorney, Agent, or Firm* — Weiss & Moy, P.C.; Karen J. S. Fouts

(57) ABSTRACT

A jointed plunger assembly has a north end cap, a south end cap, and a body therebetween. The body includes at least one joint segment. In one embodiment, multiple joint segments are provided. Joints are formed throughout the body. In one embodiment, a flex rod is positioned in the north end cap, south end cap, and body. The flex rod is configured to flex and also seal fluid within the assembly, thereby preventing fluid leakage and helping to ensure that pumped fluid is moved upward and away from the pump. The assembly is configured to flex at each joint and is capable of flexing in various directions to follow the contours of the wellbore and the pump barrel. This configuration provides increased efficiency for deviated and horizontal pumping operations and helps the assembly components to wear more evenly, extending plunger life.

20 Claims, 13 Drawing Sheets

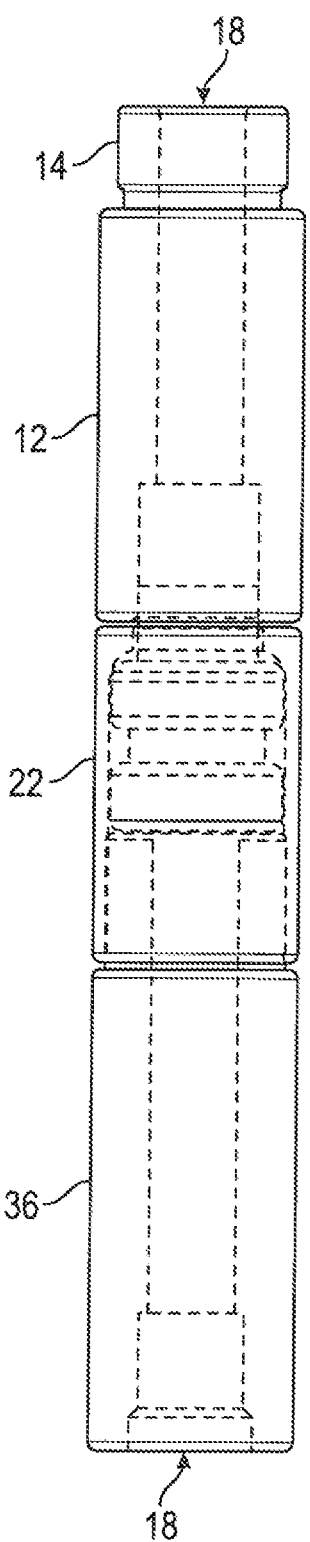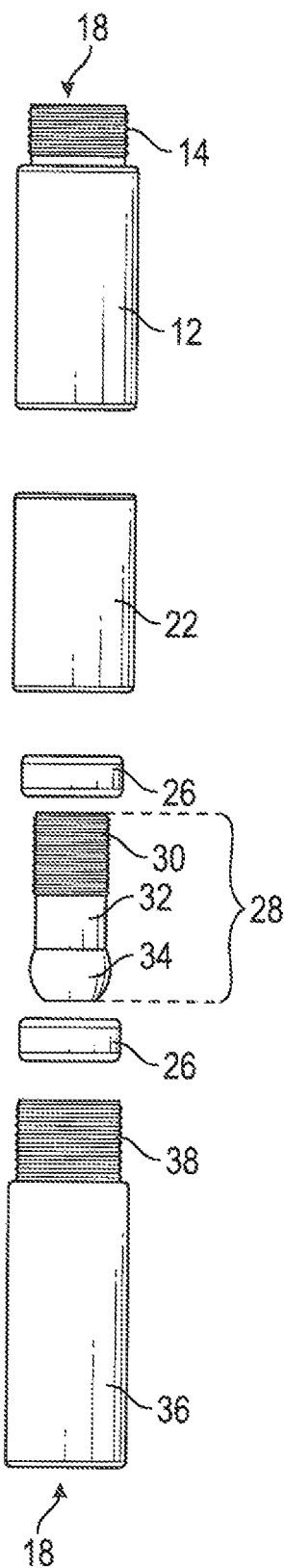
FIG. 4A
FIG. 4B

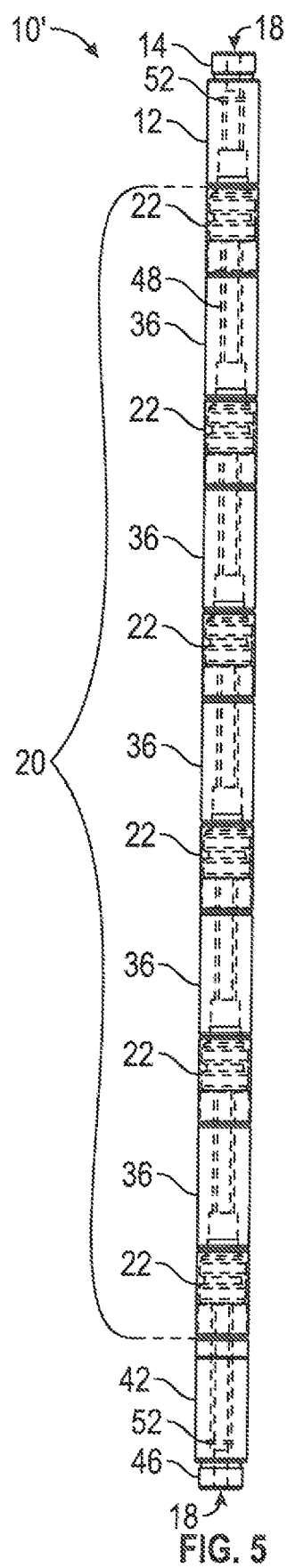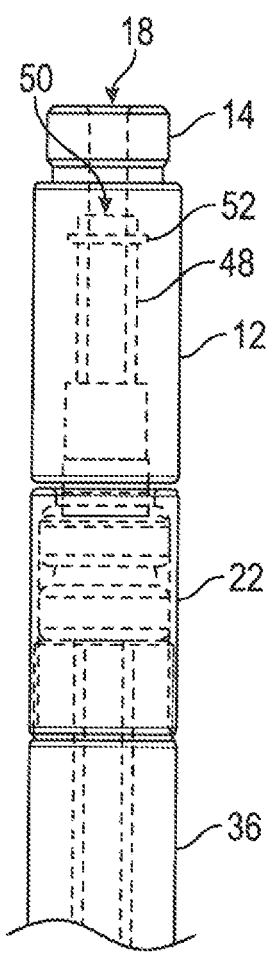
FIG. 5
FIG. 6

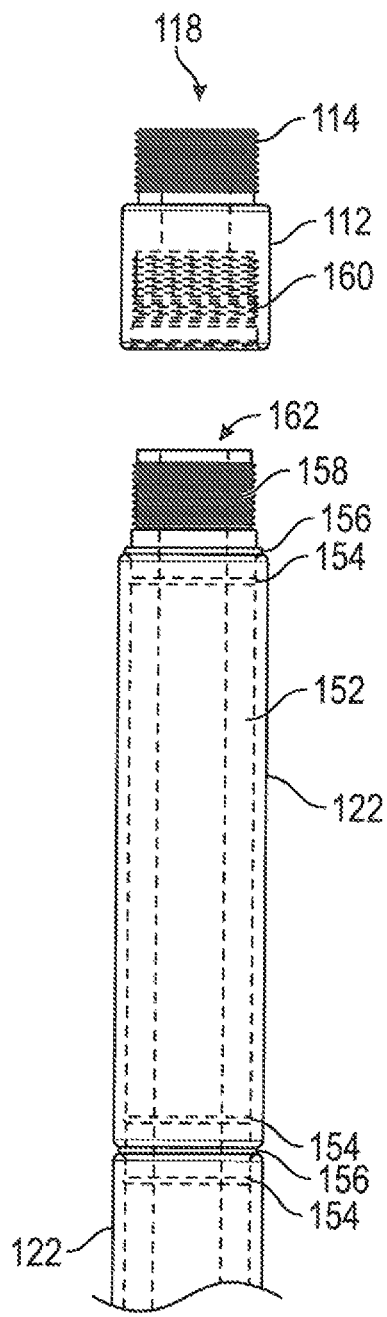
FIG. 15
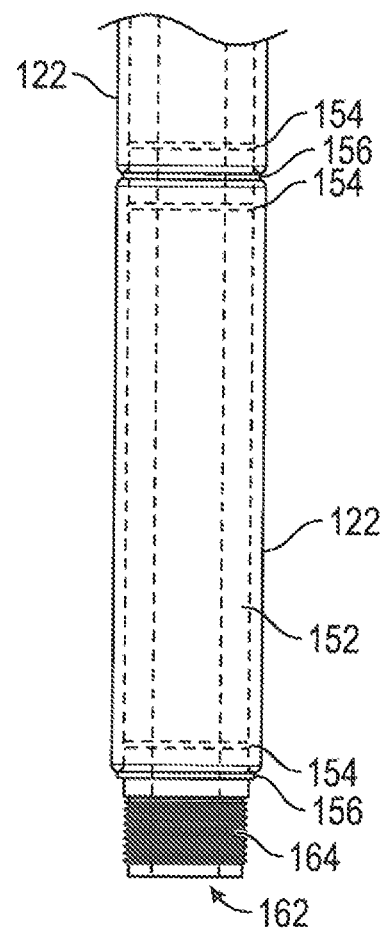
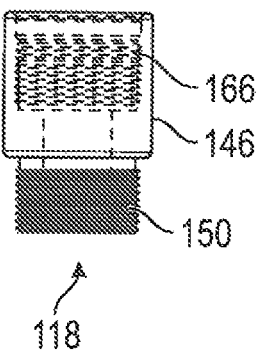
FIG. 16

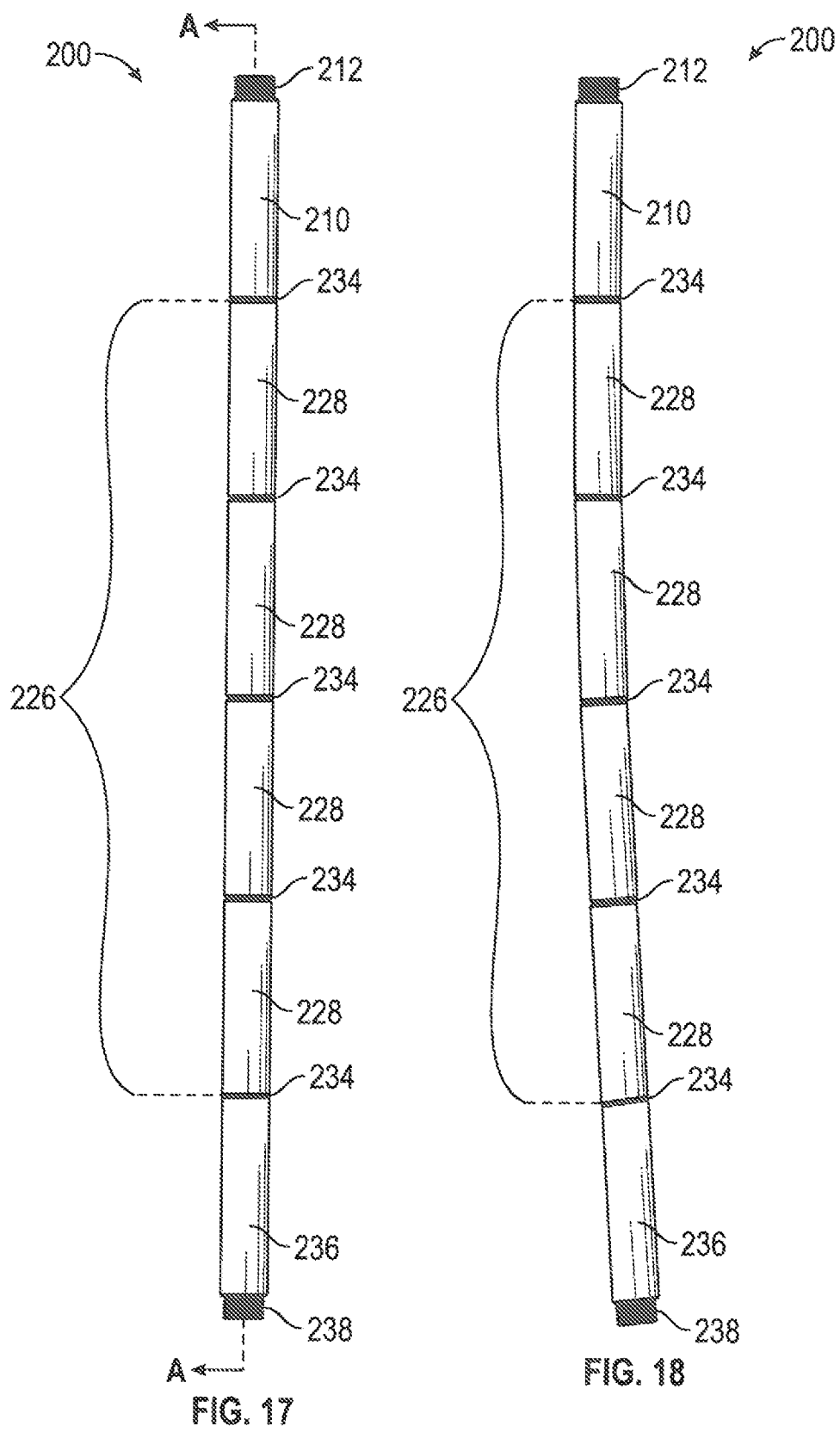

JOINTED PLUNGER ASSEMBLY AND METHOD THEREFOR

CROSS-REFERENCE TO RELATED APPLICATION

This non-provisional application claims priority to U.S. Provisional Application Ser. No. 62/681,954 entitled JOINTED PLUNGER ASSEMBLY AND METHOD THEREFOR that was filed on Jun. 7, 2018 in the name of the inventor of this non-provisional application and which is hereby incorporated in its entirety.

FIELD OF THE INVENTION

The present invention generally relates to oil pumps and plungers used therein and, more specifically, to a jointed plunger assembly that is capable of flexing and rotating within a pump barrel, and related method therefor.

BACKGROUND OF THE INVENTION

In general terms, an oil well pumping system begins with an above-ground pumping unit, which creates the up and down pumping action that moves the oil (or other substance being pumped) out of the ground and into a flow line, from which the oil is taken to a storage tank or other such structure.

Below ground, a shaft or "wellbore" is lined with piping known as "casing." Into the casing is inserted piping know as "tubing." A sucker rod, which is ultimately, indirectly coupled at its north end to the above-ground pumping unit is inserted into the tubing. The sucker rod is coupled at its south end indirectly to the subsurface oil pump itself, which is also located within the tubing, which is sealed at its base to the tubing. The sucker rod couples to the oil pump at a coupling known as a 3-wing cage. The subsurface oil pump has number of basic components, including a barrel and a plunger. The plunger operates within the barrel, and the barrel, in turn, is positioned within the tubing.

Beginning at the south end, subsurface oil pumps generally include a standing valve, which has a ball therein, the purpose of which is to regulate the passage of oil (or other substance being pumped) from downhole into the pump, allowing the pumped matter to be moved northward out of the system and into the flow line, preventing the pumped matter from dropping back southward into the hole. Oil is permitted to pass through the standing valve and into the pump by the movement of the ball off of its seat, and oil is prevented from dropping back into the hole by the seating of the ball.

North of the standing valve, coupled to the sucker rod, is a traveling valve. The purpose of a conventional traveling valve is to regulate the passage of oil from within the pump northward in the direction of the flow line, while preventing the pumped oil from slipping back down the direction of the standing valve and hole.

In use, oil is pumped from a hole through a series of "downstrokes" and "upstrokes" of the oil pump, wherein these notions imparted by the above-ground pumping unit. During the upstroke, formation pressure causes the ball in the standing valve to move upward, allowing the oil to pass through the standing valve and into the barrel of the oil pump. This oil will be held in place between the standing valve and the traveling valve. In the conventional traveling valve, the ball is located in the seated position. It is held there by the pressure from the oil that has been previously pumped. The oil located above the traveling valve is moved northward in the direction of the 3-wing cage at the end of the oil pump.

During the downstroke, the ball in the conventional traveling valve unseats, permitting the oil that has passed through the standing valve to pass therethrough. Also during the downstroke, the ball in the standing valve seats, preventing the pumped oil from slipping back down into the hole.

The process repeats itself again and again, with oil essentially being moved in stages from the hole, to above the standing valve and in the oil pump, to above the traveling valve and out of the oil pump. As the oil pump fills, the oil passes through the 3-wing cage and into the tubing. As the tubing is filled, the oil passes into the flow line, from which the oil is taken to a storage tank or other such structure.

In a tubing pump, the barrel assembly is coupled to and becomes a part of the well tubing at the bottom of the well. Tubing pumps are typically designed for pumping relatively large volumes of fluid, as compared with smaller pumps, such as insert pumps. With a tubing pump, the well tubing must be removed from the well in order to service the pump barrel. Alternatively, with an insert pump, the barrel assembly is a separate component from the well tubing. With an insert pump, the complete pump is attached to the sucker rod string and is inserted into the well tubing with the sucker rod string. As a complete unit, an insert pump may be inserted and pulled out of the well without removing the well tubing.

In the past, wellbores were typically drilled in relatively straight vertical lines. More recently, however, wellbores are being drilled vertically in part and then horizontally in part, resulting in wellbores that have some curvature or "deviation." Such wells may commonly be referred to as "deviated" wells. When drilling deviated wells, drillers typically drill vertically for some distance (e.g. one mile), through the upper zone and down to the bedrock, and then transition to drilling horizontally. One advantage to drilling wellbores in this configuration is that the horizontal area of the well typically has many more perforations in the casing, which allows for more well fluid to enter the wellbore than with typical vertical casing wells. This, in turn, allows for more well fluid to be pumped to the surface.

There are a number of problems that may be encountered with deviated wells. Horizontal well technology has created a condition in which it is difficult for the producer to place pumps in the horizontal area of the well. Horizontal wells may typically be drilled at an angle of roughly ten to twelve degrees over roughly 1000 feet to allow for a gradual slope. This results in approximately one degree of deviation for every 100 feet. A problem that occurs when drilling such wells, particularly when they are drilled relatively fast, is that the wells are not drilled perfectly, resulting in crooked wellbores. Such wells may have many slight to extreme deviations in the drill hole, which would create a non-linear configuration. When the deviated well is completed to depth, the drill pattern is positioned horizontally to drill. The pump then must be lowered from the surface through all of the deviations of the wellbore down to the horizontal section of the well where it would be placed in service. The pump could be positioned and operated within a deviation (curve) or possibly in the horizontal area of the well.

It is difficult to operate typical pumps in such a well configuration. This is due, in part, to the fact that most typical pump components are relatively rigid. Because pump barrels may typically reach up to 40 feet or more in length and may be comprised of steel having a thickness of roughly one-sixteenth of an inch, pump barrels are somewhat flexible by nature. However, this is not true with respect to the internal components of the pump, which are typically short and rigid by comparison. For example, with respect to plungers in particular, typical plungers may be comprised of steel having a thickness of roughly one-quarter of an inch. Thus, when typical pumps are placed in the deviated areas or horizontal area of the well, the internal pump components come into contact with the barrel at various pressure points. As a result, the pump components, including plungers in particular, become worn on one side, thus wearing unevenly. When the pump components become worn, they must be replaced. This can be both time consuming and expensive.

The present invention addresses these problems encountered in prior art pumping systems, and provides other, related, advantages.

SUMMARY OF THE INVENTION

In accordance with an embodiment of the present invention, a jointed plunger assembly for a pumping apparatus is disclosed. The jointed plunger assembly comprises, in combination: a north end cap having a channel formed therethrough; a south end cap having a channel formed therethrough; a body interposed between the north end cap and the south end cap, the body comprising at least one joint segment and a plurality of joints; wherein the at least one joint segment has a north end and a south end and a channel formed therethrough; wherein the plurality of joints comprises at least a first joint formed between the north end cap and the at least one joint segment, and a second joint formed between the south end cap and the at least one joint segment; wherein the body is configured to flex at each joint of the plurality of joints; and a flex rod having a north end and a south end and a channel formed therethrough; wherein the flex rod is configured to be positioned in the north end cap, the body, and the south end cap.

In accordance with another embodiment of the present invention, a jointed plunger assembly for a pumping apparatus is disclosed. The jointed plunger assembly comprises, in combination: a north end cap comprising: a north end; a shoulder; a south end, wherein an interior diameter at the south end is downwardly tapered; a channel formed from the north end through the south end; and a ridged region formed between the shoulder and the south end, the ridged region having a plurality of ridges, and the ridged region configured to receive an upper portion of a flex rod; a south end cap comprising: a north end, wherein an interior diameter at the north end is upwardly tapered; a shoulder; a south end; a channel formed from the south end through the north end; and a ridged region formed between the shoulder and the north end, the ridged region having a plurality of ridges, and the ridged region configured to receive a lower portion of a flex rod; a body interposed between the north end cap and the south end cap, the body comprising a plurality of joint segments and a plurality of joints; wherein each of the plurality of joint segments has a north end and a south end and a channel formed therethrough; wherein the plurality of joints comprises at least a first joint formed between the north end cap and a northern-most joint segment, a second joint formed between the south end cap and a southern-most joint segment, and a third joint formed between adjacent joint segments; wherein the body is configured to flex at each joint of the plurality of joints; and a flex rod having a north end and a south end and a channel formed therethrough; wherein the flex rod is configured to be positioned in the north end cap, the body, and the south end cap.

In accordance with another embodiment of the present invention, a method for pumping fluid is disclosed. The method comprises the steps of: providing a jointed plunger assembly for a pumping apparatus comprising, in combination: a north end cap having a channel formed therethrough; a south end cap having a channel formed therethrough; a body interposed between the north end cap and the south end cap, the body comprising at least one joint segment and a plurality of joints; wherein the at least one joint segment has a north end and a south end and a channel formed therethrough; wherein the plurality of joints comprises at least a first joint formed between the north end cap and the at least one joint segment, and a second joint formed between the south end cap and the at least one joint segment; wherein the body is configured to flex at each joint of the plurality of joints; and flex rod having a north end and a south end and a channel formed therethrough; wherein the flex rod is configured to be positioned in the north end cap, the body, and the south end cap; positioning the jointed plunger assembly in the pumping apparatus so that the jointed plunger assembly will move northward during the upstroke of the pumping apparatus, and southward with the downstroke of the pumping apparatus; and utilizing the jointed plunger assembly, pumping fluid.

BRIEF DESCRIPTION OF THE DRAWINGS

The present application is further detailed with respect to the following drawings. These figures are not intended to limit the scope of the present application, but rather, illustrate certain attributes thereof.

FIG. 4A is a side view of the portion of the jointed plunger assembly shown in FIG. 3A;

FIG. 4B is a side, exploded view of the portion of the jointed plunger assembly shown in FIG. 3A;

FIG. 5 is a side view of another embodiment of a jointed plunger assembly, illustrating an optional flex rod positioned therein, in accordance with one or more aspects of the present invention;

FIG. 6 is a side view of a northern portion of the jointed plunger assembly of FIG. 5;

FIG. 15 is a side, partially exploded view of the portion of the jointed plunger assembly shown in FIG. 14;

FIG. 16 is a side, partially exploded view of a southern portion of the jointed plunger assembly of FIG. 13;

FIG. 17 is a side view of another embodiment of a jointed plunger assembly, in accordance with one or more aspects of the present invention;

FIG. 18 is a side view of the jointed plunger assembly of FIG. 17 shown in a flexed configuration;

DETAILED DESCRIPTION OF THE INVENTION

Figure 1:
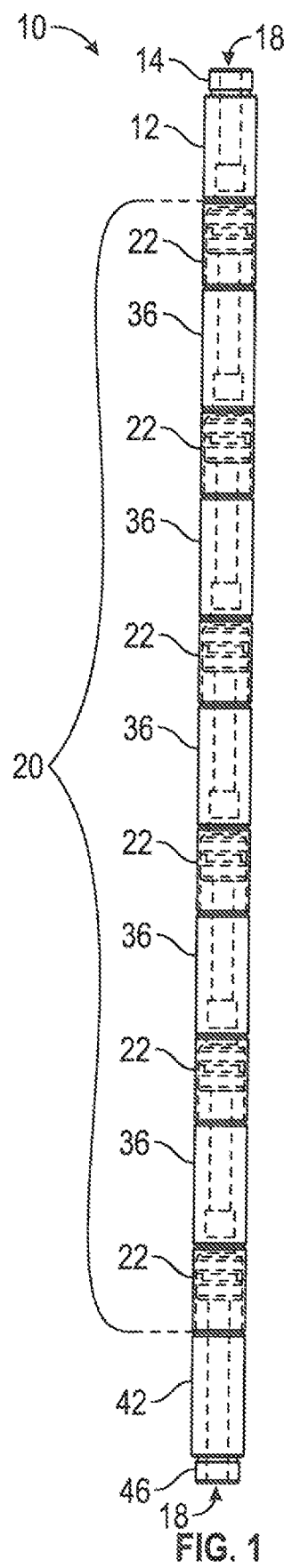
FIG. 1 is a side view of an embodiment of a jointed plunger assembly in accordance with one or more aspects of the present invention.

The description set forth below in connection with the appended drawings is intended as a description of presently preferred embodiments of the disclosure and is not intended to represent the only forms in which the present disclosure may be constructed and/or utilized. The description sets forth the functions and the sequence of steps for constructing and operating the disclosure in connection with the illustrated embodiments. It is to be understood, however, that the same or equivalent functions and sequences may be accomplished by different embodiments that are also intended to be encompassed within the spirit and scope of this disclosure.

FIGS. 1-23, together, disclose embodiments of a jointed plunger assembly of the present invention. Referring to FIGS. 1-4B, reference number 10 refers generally to one embodiment of the jointed plunger assembly. Referring to FIGS. 5-6, reference number 10' refers generally to another embodiment of the jointed plunger assembly. Referring to FIGS. 7-12, reference number 100 refers generally to another embodiment of the jointed plunger assembly. Referring to FIGS. 13-16, reference number 100' refers generally to another embodiment of the jointed plunger assembly. Referring to FIGS. 17-23, reference number 200 refers generally to another embodiment of the jointed plunger assembly. The jointed plunger assemblies 10, 10', 100, 100', and 200 are adapted to function within a pump barrel in a deviated well. In describing the structure of the jointed plunger assemblies 10, 10', 100, 100', and 200 and their operation, the terms "north" and "south" are utilized. The term "north" is intended to refer to that end of the pumping system that is more proximate the pumping unit, while the term "south" refers to that end of the system that is more distal the pumping unit, or "downhole." In their simplest forms, the jointed plunger assembly 10 and jointed plunger assembly 10' may comprise a north end cap 12, a body 20 comprised of a plurality of joint segments 22 and coupler segments 36, and a south end cap 46, while the jointed plunger assemblies 100 and 100' may comprise a north end cap 112, a body 120 comprised of a plurality of joint segments 122, and a south end cap 146. In its simplest form, the jointed plunger assembly 200 may comprise a north end cap 210, a body 226 comprised of a plurality of joint segments 228, and a south end cap 236.

FIGS. 1-4B show one embodiment of the jointed plunger assembly 10. The jointed plunger assembly 10 is substantially cylindrical and has a center channel 18 formed completely therethrough. The jointed plunger assembly 10 may have a north end cap 12 that is configured to be coupled to a variety of pump components, as discussed further herein. The jointed plunger assembly 10 may also have a south end cap 42 that is configured to be coupled to a variety of pump components, as also discussed further herein. The jointed plunger assembly 10 may also have a body 20 juxtaposed between the north end cap 12 and south end cap 42. The body 20 may have a plurality of joint segments 22 and coupler segments 36. The joint segments 22 and coupler segments 36 are configured to be removably coupled together to form a length of the body 20 of the jointed plunger assembly 10. Although the body 20 in this embodiment is shown as having six joint segments 22 and five coupler segments 36, it should be clearly understood that any suitable number of joint segments 22 and coupler segments 36 may be used in order to form jointed plunger assemblies 10 of varying lengths, depending on the conditions and configuration of the particular well in which the jointed plunger assembly 10 is employed.

Figure 3B:
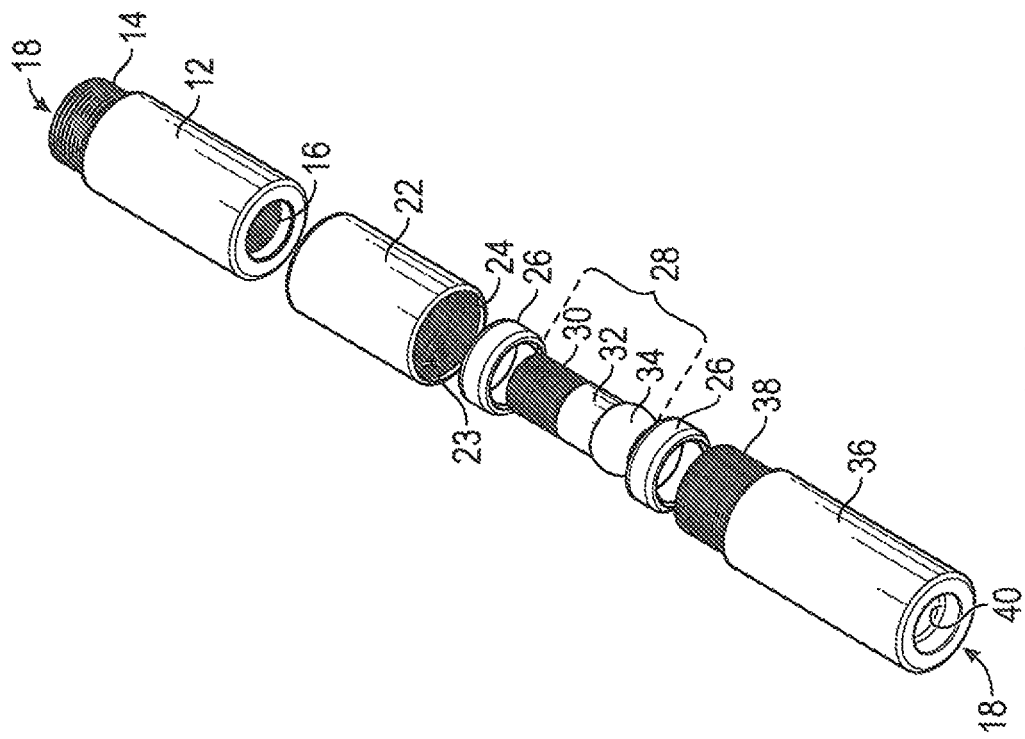
FIG. 3B is a perspective, exploded view of the portion of the jointed plunger assembly shown in FIG. 3A.

Referring to FIGS. 3B and 4B, various components of the jointed plunger assembly 10 will be discussed in further detail. The north end cap 12 is cylindrical and has center channel 18 formed completely therethrough. The north end cap 12 may have threading 14 to couple the north end cap 12 to a variety of pump components. For example, the north end cap 12 may be coupled to the southern end of any of various top plunger adapters. Such top plunger adapters may be similar to those disclosed in U.S. Pat. No. 7,428,923, which issued on Sep. 30, 2008 to the same Applicant herein, and U.S. Pat. No. 7,713,035, which issued on May 11, 2010 to the same Applicant herein, both of which are incorporated herein by reference. As another example, the north end cap 12 may be coupled to the southern end of a screen filter assembly. One such screen filter assembly may be similar to that disclosed in U.S. Pat. No. 9,957,782, which issued on May 1, 2018 to the same Applicant herein and which is incorporated herein by reference. Another such screen filter assembly may be similar to that disclosed in U.S. patent application Ser. No. 15/939,839, which was filed on Mar. 29, 2018 by the same Applicant herein and which is incorporated herein by reference. As yet another example, the north end cap 12 may be coupled to the southern end of a cyclone plunger adapter, which may be similar to that disclosed in the above-referenced U.S. Pat. No. 7,713,035. The north end cap 12 may also be coupled to various other pump components, including standard pump components, as may be needed for particular well conditions and configurations. The threading 14 may comprise API plunger threading. While in this embodiment the threading 14 is shown as male (pin) threading, it should be understood that the threading 14 may be male or female (box) threading 14, as long as it engages corresponding male or female threading present on the various pump component to which it may be coupled. The north end cap 12 may also have threading 16 that is configured to mate with threading 30 on a ball joint 28, as further discussed herein.

The body 20, as noted above, may have a plurality of joint segments 22 and coupler segments 36. Referring first to joint segment 22, joint segment 22 is cylindrical and has a center channel 23 formed completely therethrough. Joint segment 22 may have threading 24 to couple a southern portion of joint segment 22 to a northern portion of coupler segment 36. Joint segment 22 is configured to receive a ball joint 28 within the center channel 23. As shown in FIG. 1, for example, the number of ball joints 28 may be equal to the number of joint segments 22 in the jointed plunger assembly 10. Although this embodiment is shown as having six joint segments 22 and six ball joints 28, it should be clearly understood that any suitable number of joint segments 22 and ball joints 28 may be used, depending on the conditions and configuration of the particular well in which the jointed plunger assembly 10 is employed. Referring again to FIGS. 3B and 4B, each joint segment 22 is further configured to receive at least one seat 26 within the center channel 23 of joint segment 22. As shown in this embodiment, it is preferred to have two seats 26. As shown in this embodiment, a first seat 26 is positioned around a northern portion of the ball 34, while a second seat 26 is positioned around a southern portion of the ball 34. The seats 26, as shown in this embodiment, may be substantially ring-shaped. An outer diameter of each seat 26 may be less than an inner diameter of joint segment 22, such that the seats 26 may be positioned within joint segment 22. An inner diameter of each seat 26 may be greater than an outer diameter of the ball 34, such that the seats 26 may be positioned around the ball 34, as shown in FIG. 4A, for example. During pumping operations, the northern-most seat 26 will bear a heavier load compared to the southern-most seat 26. Thus, in one embodiment, it is preferred that the northern-most seat 26 be comprised of titanium carbide, or some other suitable hard material. In such an embodiment, the southern-most seat 26 may be comprised of a composite material. However, it should be clearly understood that the southern-most seat 26 may be comprised of titanium carbide, a composite material, or some other suitable material. The seats 26 are adapted to seal out fluid around the ball 34. Referring again to FIG. 1, although this embodiment of the jointed plunger assembly 10 is shown as having twelve seats 26, it should be clearly understood that any suitable number of seats 26 may be used, depending on the conditions and configuration of the particular well in which the jointed plunger assembly 10 is employed.

Figure 2:
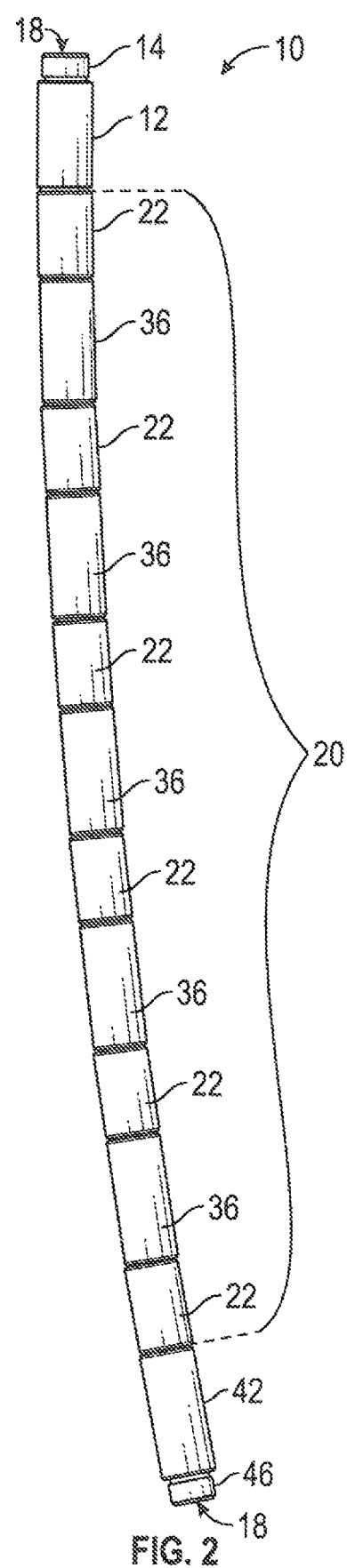
FIG. 2 is a side view of the jointed plunger assembly of FIG. 1 shown in a flexed configuration.
Figure 3A:
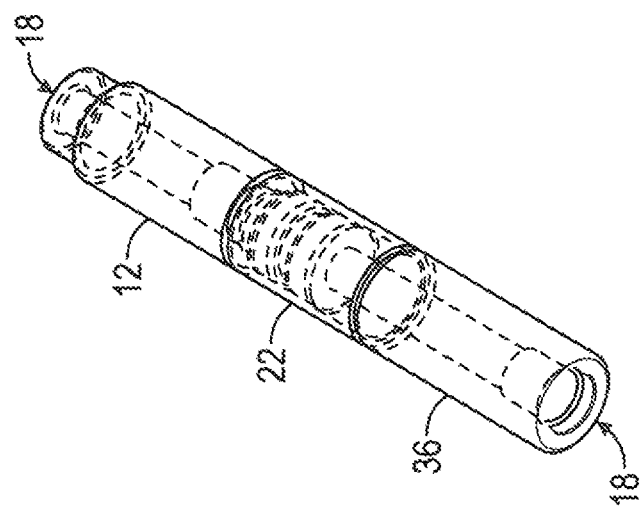
FIG. 3A is a perspective view of a northern portion of the jointed plunger assembly of FIG. 1.

Referring to the ball joint 28, ball joint 28 has center channel 18 formed completely therethrough. Ball joint 28 may have threading 30 that is configured to mate with threading 16 on the north end cap 12 and to couple a northern portion of the ball joint 28 to a southern portion of the north end cap 12, where a given joint segment 22 is the northern-most joint segment 22 of the jointed plunger assembly 10. In addition, threading 30 is configured to mate with threading 40 on coupler segment 36 and to couple a northern portion of the ball joint 28 to a southern portion of coupler segment 36 where a given joint segment 22 is juxtaposed between two coupler segments 36, as shown in FIGS. 1-2, for example. The ball joint 28 may also have a neck 32 and a ball 34. The ball 34 is configured to be interposed between the seats 26, as shown in FIGS. 3A and 4A, for example.

Coupler segment 36 will now be discussed. Couple segment 36 is cylindrical and has center channel 18 formed completely therethrough. Coupler segment 36 may have threading 38 that is configured to mate with threading 24 of joint segment 22 and to couple a northern portion of coupler segment 36 to a southern portion of joint segment 22. Coupler segment 36 may also have threading 40. Threading 40 is configured to mate with threading 30 on the ball joint 28 and to couple a northern portion of the ball joint 28 to a southern portion of coupler segment 36 where a given joint segment 22 is juxtaposed between two coupler segments 36, as shown in FIGS. 1-2, for example.

Referring to FIGS. 1-2, the south end cap 42 of the jointed plunger assembly 10 will be discussed. The south end cap 42 is cylindrical and has center channel 18 formed completely therethrough. The south end cap 42 may have threading 46 to couple the south end cap 42 to a variety of pump components, such as a traveling valve. The threading 46 may comprise API plunger threading. While in this embodiment the threading 46 is shown as male (pin) threading, it should be clearly understood that the threading 46 may be male or female (box) threading 46, as long as it engages corresponding male or female threading present on the various pump component to which it may be coupled. The south end cap 42 may also have threading, at a northern portion thereof (similar to threading 38 on coupler segment 36), that is configured to mate with threading 24 of joint segment 22 and to couple a northern portion of south end cap 42 to a southern portion of joint segment 22, where a given joint segment 22 is the southern-most joint segment 22 of the jointed plunger assembly 10.

FIGS. 5-6 show another embodiment of the jointed plunger assembly 10, hereinafter jointed plunger assembly 10'. The jointed plunger assembly 10' is substantially the same as the jointed plunger assembly 10, except that in the jointed plunger assembly 10', an optional flex rod 48 is included, along with seals 52. For this reason, the same reference numbers used in describing the features of the jointed plunger assembly 10 will be used when describing the identical features of the jointed plunger assembly 10'.

In this embodiment, the flex rod 48 comprises a substantially elongated tube having a center channel 50 formed completely therethrough. The flex rod 48 is configured to be positioned within the center channel 18 of the jointed plunger assembly 10'. Accordingly, an outer diameter of the flex rod 48 may be less than a diameter of the center channel 18. As shown in this embodiment, the flex rod 48 may have a length that is slightly less than an overall length of the jointed plunger assembly 10'. In this way, the flex rod 48 is configured to be positioned through the center channel 18 of substantially the entire jointed plunger assembly 10', including through the center channel 18 of north end cap 12, of each joint segment 22, of ball joint 28, of each coupler segment 36, and of south end cap 42. The flex rod 48 is capable of flexing when the jointed plunger assembly 10' is in a flexed configuration, similar to the flexed configuration of the jointed plunger assembly 10 shown in FIG. 2. The flex rod 48 may be comprised of a flexible polymer fiber material, such as Fiberglass or carbon fiber material, for example. According to one embodiment, the flex rod 48 may be comprised of a strong, flexible material that has shape memory, such as Nitinol, for example.

The flex rod 48 may further include at least one seal 52. As shown in this embodiment, two seals 52 are used, with a first seal 52 positioned proximate a northern end of the flex rod 48 and a second seal 52 positioned proximate a southern end of the flex rod 48. However, it should be clearly understood that any suitable number of seals 52 may be used, as may be needed depending upon the conditions and configuration of the well in which the jointed plunger assembly 10' is employed. The seals 52 may be disposed on the outer surface of the flex rod 48. The seals 52 may comprise O-ring seals or some other suitable engineered seals, as may be needed for particular well conditions and configurations.

During pumping operations, fluid-lifting pressure and friction may exert enough movement on the jointed plunger assembly 10 to result in fluid leakage. Thus, the flex rod 48 of the jointed plunger assembly 10' is configured to seal fluid within the jointed plunger assembly 10', thereby preventing fluid from escaping from the jointed plunger assembly 10', particularly at locations where the individual components, including the north end cap 12, joint segments 22, coupler segments 36, and south end cap 42, are coupled together. The seals 52 provide a seal around the flex rod 48, and are configured to further seal fluid within the jointed plunger assembly 10'. Thus, the flex rod 48, sealed at each end with a seal 52, helps to ensure that all pumped fluid is moved upward and away from the pump.

The north end cap 12, joint segments 22, coupler segments 36, and south end cap 42 of the jointed plunger assembly 10 and jointed plunger assembly 10' may be comprised of steel (such as 316 stainless steel or carbon steel), a nickel alloy, special alloys, brass, or some other suitable material, as may be needed for particular well conditions and configurations. The north end cap 12, joint segments 22, coupler segments 36, and south end cap 42 of the jointed plunger assembly 10 and jointed plunger assembly 10' may be coated, such as with a hard surface spray metal or the like, for increased durability and resistance against wear.

FIGS. 7-12 show another embodiment of a jointed plunger assembly, hereinafter jointed plunger assembly 100. The jointed plunger assembly 100 is substantially cylindrical and has a center channel 118 formed completely therethrough. The jointed plunger assembly 100 may have a north end cap 112 that is configured to be coupled to a variety of pump components, as discussed further herein. The jointed plunger assembly 100 may also have a south end cap 146 that is configured to be coupled to a variety of pump components, as also discussed further herein. The jointed plunger assembly 100 may also have a body 120 juxtaposed between the north end cap 112 and south end cap 146. The body 120 may have a plurality of joint segments 122. The joint segments 122 are configured to be removably coupled together to form a length of the body 120 of the jointed plunger assembly 100. Although the body 120 in this embodiment is shown as having eleven joint segments 122, it should be clearly understood that any suitable number of joint segments 122 may be used in order to form jointed plunger assemblies 100 of varying lengths, depending on the conditions and configuration of the particular well in which the jointed plunger assembly 100 is employed.

Figure 9:
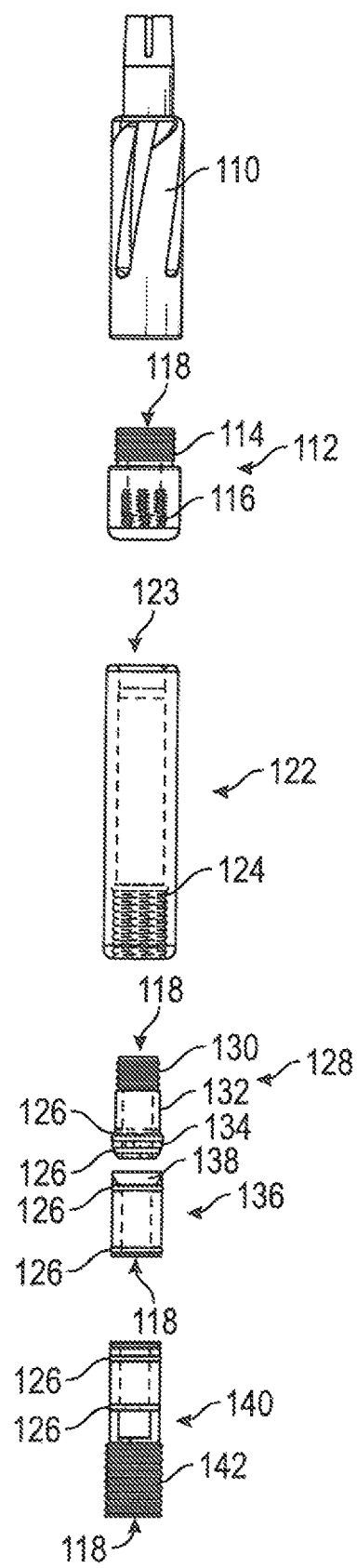
FIG. 9 is a side, exploded view of a northern portion of the jointed plunger assembly of FIG. 7.

Referring to FIG. 9, various components of the jointed plunger assembly 100 will be discussed in further detail. The north end cap 112 is cylindrical and has center channel 118 formed completely therethrough. The north end cap 112 may have threading 114 to couple the north end cap 112 to a variety of pump components, such as a cyclone plunger adapter 110, for example, as shown in this embodiment. The cyclone plunger adapter 110 may be similar to that disclosed in the above-referenced U.S. Pat. No. 7,713,035. As further examples, the north end cap 112 may be coupled to the southern end of any of various top plunger adapters. Such top plunger adapters may be similar to those disclosed in the above-referenced U.S. Pat. Nos. 7,428,923 and 7,713,035. As another example, the north end cap 112 may be coupled to the southern end of a screen filter assembly. One such screen filter assembly may be similar to that disclosed in the above-referenced U.S. Pat. No. 9,957,782. Another such screen filter assembly may be similar to that disclosed in the above-referenced U.S. patent application Ser. No. 15/939,839. The north end cap 112 may also be coupled to various other pump components, including standard pump components, as may be needed for particular well conditions and configurations. The threading 114 may comprise API plunger threading. While in this embodiment the threading 114 is shown as male (pin) threading, it should be clearly understood that the threading 114 may be male or female (box) threading 114, as long as it engages corresponding male or female threading present on the various pump component to which it may be coupled. The north end cap 112 may also have threading 116 that is configured to mate with threading 130 on a ball joint 128, as further discussed herein.

Figure 7:
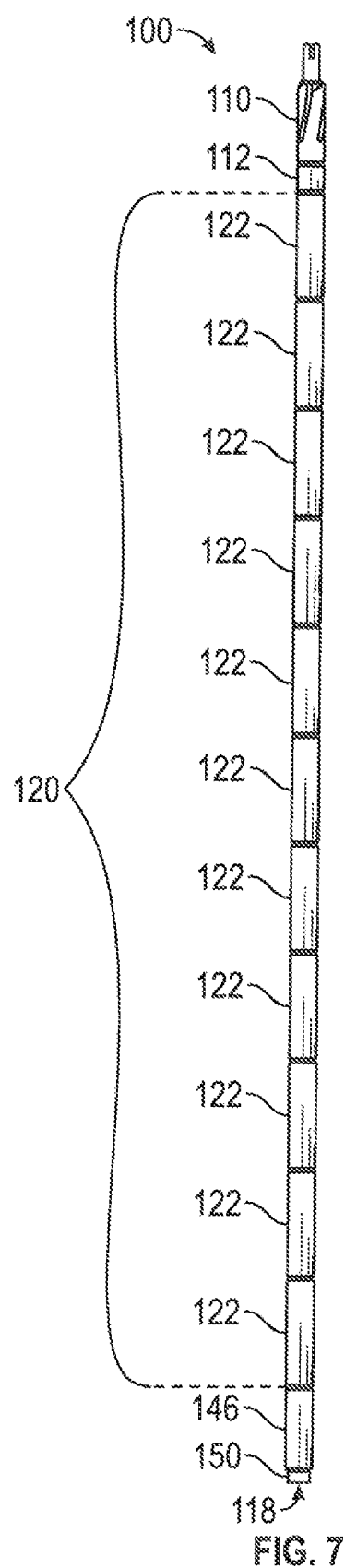
FIG. 7 is a side view of another embodiment of a jointed plunger assembly in accordance with one or more aspects of the present invention.
Figure 8:
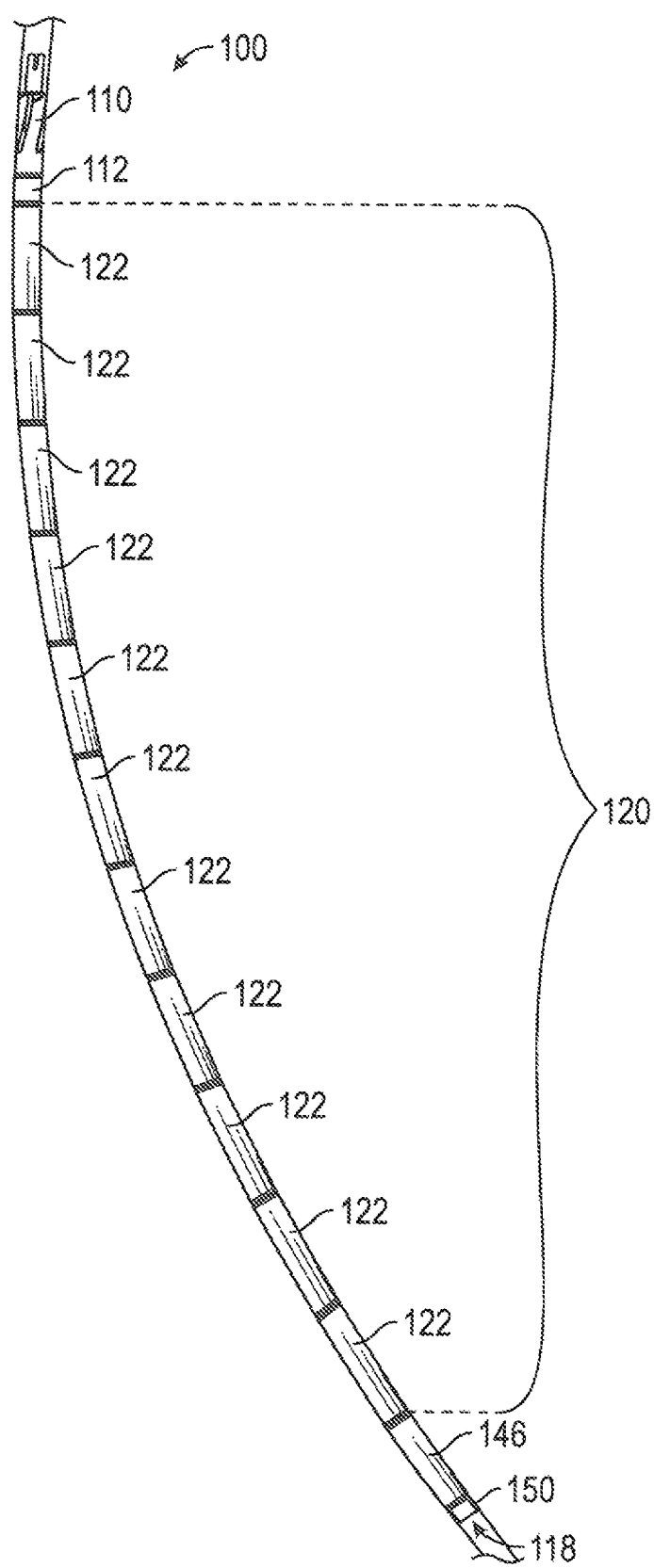
FIG. 8 is a side view of the jointed plunger assembly of FIG. 7 shown in a flexed configuration within a wellbore in accordance with one or more aspects of the present invention.

The body 120, as noted above, may have a plurality of joint segments 122. Joint segment 122 is cylindrical and has a center channel 123 formed completely therethrough. Joint segment 122 may have threading 124 to couple a southern portion of joint segment 122 to an adapter 140, as discussed further herein. Joint segment 122 is configured to receive a ball joint 128 within the center channel 123. The number of ball joints 128 may be equal to the number of joint segments 122 in the jointed plunger assembly 100. As shown in FIGS. 7-8, in one embodiment, the jointed plunger assembly 100 may have eleven joint segments 122 (and, correspondingly, eleven ball joints 128, which are not shown in FIGS. 7-8). However, it should be clearly understood that any suitable number of joint segments 122 and ball joints 128 may be used, depending on the conditions and configuration of the particular well in which the jointed plunger assembly 100 is employed.

Referring again to FIG. 9, ball joint 128 has center channel 118 formed completely therethrough. Ball joint 128 may have threading 130 that is configured to mate with threading 116 on the north end cap 112 and to couple a northern portion of the ball joint 128 to a southern portion of the north end cap 112, where a given joint segment 122 is the northern-most joint segment 122 of the jointed plunger assembly 100. In addition, threading 130 is configured to mate with threading 144 on adapter 140 and to indirectly couple a northern portion of the ball joint 128 to a southern portion of joint segment 122 where a given joint segment 122 is juxtaposed between two other joint segments 122, as shown in FIGS. 7-8, for example. Referring again to FIG. 9, the ball joint 128 may also have a neck 132 and a ball 134. The ball 134 may include seals 126 positioned around an outer diameter of the ball 134. The seals 126 are adapted to seal out fluid around the ball 134. As shown in this embodiment, it is preferred to use two seals 126 around the ball 134. However, it should be clearly understood that any suitable number of seals 126 may be used, depending on the conditions and configuration of the particular well in which the jointed plunger assembly 100 is employed. The seals 126 may comprise O-ring seals or some other suitable engineered seals, as may be needed for particular well conditions and configurations.

Figures 11, 12:
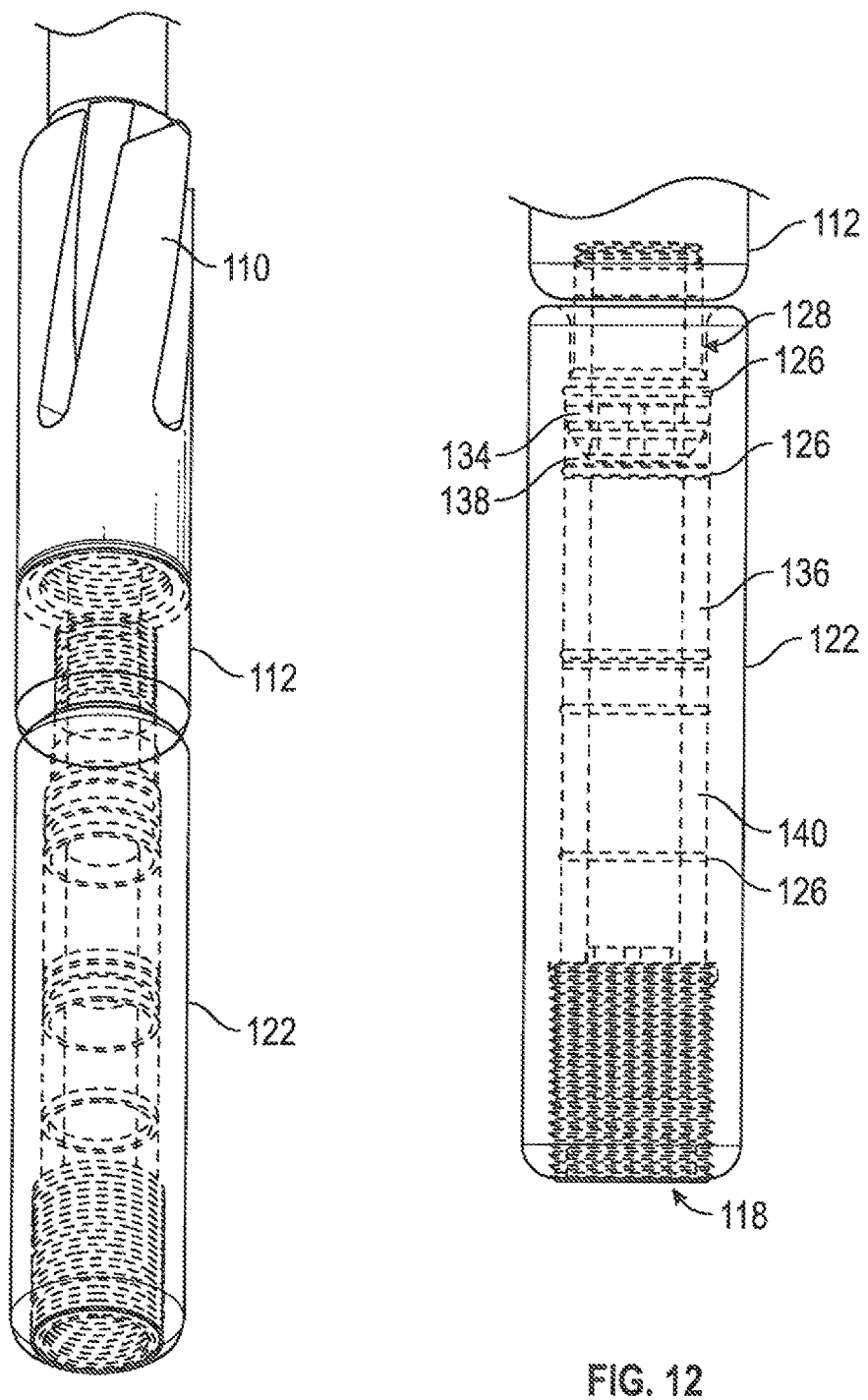
FIG. 11 is a side, perspective view of the northern portion of the jointed plunger assembly shown in FIG. 9.
FIG. 12 is a side view of a joint segment of the jointed plunger assembly of FIG. 7.

Still referring to FIG. 9, each joint segment 122 is further configured to receive a ball coupler component 136 within the center channel 123 of joint segment 122. Ball coupler component 136 is substantially cylindrical and has center channel 118 formed completely therethrough. Ball coupler component 136 includes a downwardly tapered socket region 138. Socket region 138 is adapted to receive ball 134. Accordingly, an outer diameter of each ball 134 may be less than an inner diameter of each socket region 138, such that each ball 134 may be positioned within each socket region 138, as shown in FIG. 12, for example. As can be seen in FIG. 12, ball coupler component 136 is configured to be positioned southward of ball joint 128. Referring to FIG. 9, the ball coupler component 136 may further include at least one seal 126. As shown in this embodiment, two seals 126 are used, with a first seal 126 positioned proximate a northern end of the ball coupler component 136 and a second seal 126 positioned proximate a southern end of the ball coupler component 136. However, it should be clearly understood that any suitable number of seals 126 may be used, as may be needed depending upon the conditions and configuration of the well in which the jointed plunger assembly 100 is employed. The seals 126 may be disposed on the outer surface of the ball coupler component 136. The seals 126 are adapted to seal fluid within the jointed plunger assembly 100, thereby helping to ensure that all pumped fluid is moved upward and away from the pump.

Figure 10:
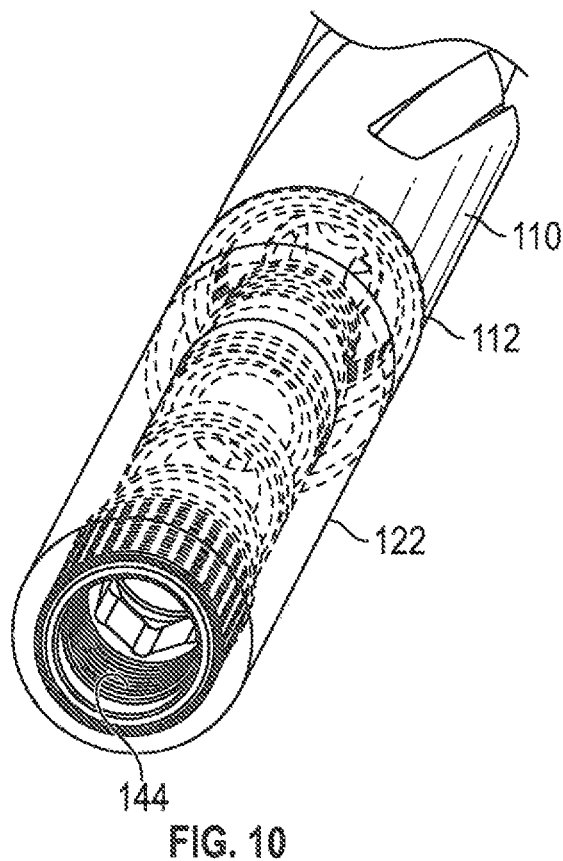
FIG. 10 is a bottom, perspective view of the northern portion of the jointed plunger assembly shown in FIG. 9.

Referring again to FIG. 9, each joint segment 122 is further configured to receive an adapter 140 within the center channel 123 of joint segment 122. Adapter 140 is substantially cylindrical and has center channel 118 formed completely therethrough. Adapter 140 may have threading 142 that is adapted to mate with threading 124 on joint segment 122 and to couple a southern portion of adapter 140 to a southern portion of joint segment 122. Adapter 140 is configured to be positioned southward of and abut ball coupler component 136, as shown in FIG. 12, for example. Adapter 140 may further include threading 144 (as shown in FIG. 10) that is adapted to mate with threading 130 on ball joint 128 and to indirectly couple a northern portion of the ball joint 128 to a southern portion of joint segment 122, as discussed above. The adapter 140 may further include at least one seal 126. As shown in this embodiment, two seals 126 are used, with a first seal 126 positioned proximate a northern end of the adapter 140 and a second seal 126 positioned southward of the first seal 126. However, it should be clearly understood that any suitable number of seals 126 may be used, as may be needed depending upon the conditions and configuration of the well in which the jointed plunger assembly 100 is employed. The seals 126 may be disposed on the outer surface of the adapter 140. The seals 126 are adapted to seal fluid within the jointed plunger assembly 100, thereby helping to ensure that all pumped fluid is moved upward and away from the pump.

Referring to FIGS. 7-8, the south end cap 146 of the jointed plunger assembly 100 will be discussed. The south end cap 146 is cylindrical and has center channel 118 formed completely therethrough. The south end cap 146 may have threading 150 to couple the south end cap 146 to a variety of pump components, such as a traveling valve. The threading 150 may comprise API plunger threading. While in this embodiment the threading 150 is shown as male (pin) threading, it should be clearly understood that the threading 150 may be male or female (box) threading 150, as long as it engages corresponding male or female threading present on the various pump component to which it may be coupled. The south end cap 146 may also have threading, at a northern portion thereof (similar to threading 114 on north end cap 112), that is configured to mate with threading 144 of joint segment 122 and to couple a northern portion of south end cap 146 to a southern portion of joint segment 122, where a given joint segment 122 is the southern-most joint segment 122 of the jointed plunger assembly 100.

The north end cap 112, joint segments 122, and south end cap 146 of the jointed plunger assembly 100 may be comprised of steel (such as 316 stainless steel or carbon steel), a nickel alloy, special alloys, brass, or some other suitable material, as may be needed for particular well conditions and configurations. The north end cap 112, joint segments 122, and south end cap 146 of the jointed plunger assembly 100 may be coated, such as with a hard surface spray metal or the like, for increased durability and resistance against wear.

FIGS. 13-16 show another embodiment of the jointed plunger assembly 100, hereinafter jointed plunger assembly 100'. The jointed plunger assembly 100' is substantially the same as the jointed plunger assembly 100, except that in the jointed plunger assembly 100', an optional flex rod 152 is included, along with seals 154 and spacers 156. For this reason, the same reference numbers used in describing the features of the jointed plunger assembly 100 will be used when describing the identical features of the jointed plunger assembly 100'.

In this embodiment, the flex rod 152 comprises a substantially elongated tube having a center channel 162 formed completely therethrough. The flex rod 152 is configured to be positioned within the jointed plunger assembly 100'. Accordingly, an outer diameter of the flex rod 152 may be less than an inner diameter of the jointed plunger assembly 100'. As shown in this embodiment, the flex rod 152 may have a length that is slightly less than an over-all length of the jointed plunger assembly 100'. In this way, the flex rod 152 is configured to be positioned through substantially the entire jointed plunger assembly 100', including through a portion of the north end cap 112, through each joint segment 122, and through a portion of the south end cap 146. The flex rod 152 is capable of flexing when the jointed plunger assembly 100' is in a flexed configuration, similar to the flexed configuration of the jointed plunger assembly 100' shown in FIG. 13, for example. The flex rod 152 may be comprised of a flexible polymer fiber material, such as Fiberglass or carbon fiber material, for example. According to one embodiment, the flex rod 152 may be comprised of a strong, flexible material that has shape memory, such as Nitinol, for example.

Referring to FIG. 15, in this embodiment, the north end cap 112 may further include threading 160 to couple a southern end of the north end cap 112 to a northern end of the flex rod 152. The flex rod 152 may include threading 158 that is configured to mate with threading 160 of the north end cap 112. Similarly, and referring now to FIG. 16, the south end cap 146 may have threading 166 to couple a northern end of the south end cap 146 to a southern end of the flex rod 152. The flex rod 152 may include threading 164 that is configured to mate with threading 166 of the south end cap 146.

The flex rod 152 may further include at least one seal 154. Referring to FIGS. 13-16, as shown in this embodiment, two seals 154 are used per each joint segment 122, with a first seal 154 positioned proximate a northern end of each joint segment 122 and a second seal 154 positioned proximate a southern end of each joint segment 122. For example, as shown in this embodiment, specifically in FIG. 13, twelve seals 154 and six joint segments 122 are used. However, it should be clearly understood that any suitable number of seals 154 may be used, as may be needed depending upon the number of joint segments 122 used and/or upon the conditions and configuration of the well in which the jointed plunger assembly 100' is employed. The seals 154 may be disposed on the outer surface of the flex rod 152. The seals 154 may comprise O-ring seals or some other suitable engineered seals, as may be needed for particular well conditions and configurations.

The jointed plunger assembly 100' may further include at least one spacer 156. As shown in this embodiment, one spacer 156 is used at each location where the individual components, including the north end cap 112, joint segments 122, and south end cap 146, are coupled together. For example, as shown in this embodiment, and moving from top to bottom within FIG. 13 (corresponding to movement from north to south) seven spacers 156 are used, with a first spacer 156 positioned between the north end cap 112 and northern-most joint segment 122, second through sixth spacers 156 positioned between adjacent joint segments 122, and a seventh spacer 156 positioned between the southern-most joint segment 122 and south end cap 146. However, it should be clearly understood that any suitable number of spacers 156 may be used, as may be needed depending upon the number of joint segments 122 used and/or upon the conditions and configuration of the well in which the jointed plunger assembly 100' is employed. The spacers 156 may be disposed on the outer surface of the flex rod 152. The spacers 156 may comprise O-ring spacers or some other suitable engineered spacers, as may be needed for particular well conditions and configurations.

During pumping operations, fluid-lifting pressure and friction may exert enough movement on the jointed plunger assembly 100' to result in fluid leakage. Thus, the flex rod 152 of the jointed plunger assembly 100' is configured to seal fluid within the jointed plunger assembly 100', thereby preventing fluid from escaping from the jointed plunger assembly 100', particularly at locations where the individual components, including the north end cap 112, joint segments 122, and south end cap 146, are coupled together. The seals 154 provide a seal around the flex rod 152, and are configured to further seal fluid within the jointed plunger assembly 100'. Thus, the flex rod 152, sealed with seals 154, helps to ensure that all pumped fluid is moved upward and away from the pump.

Figure 19:
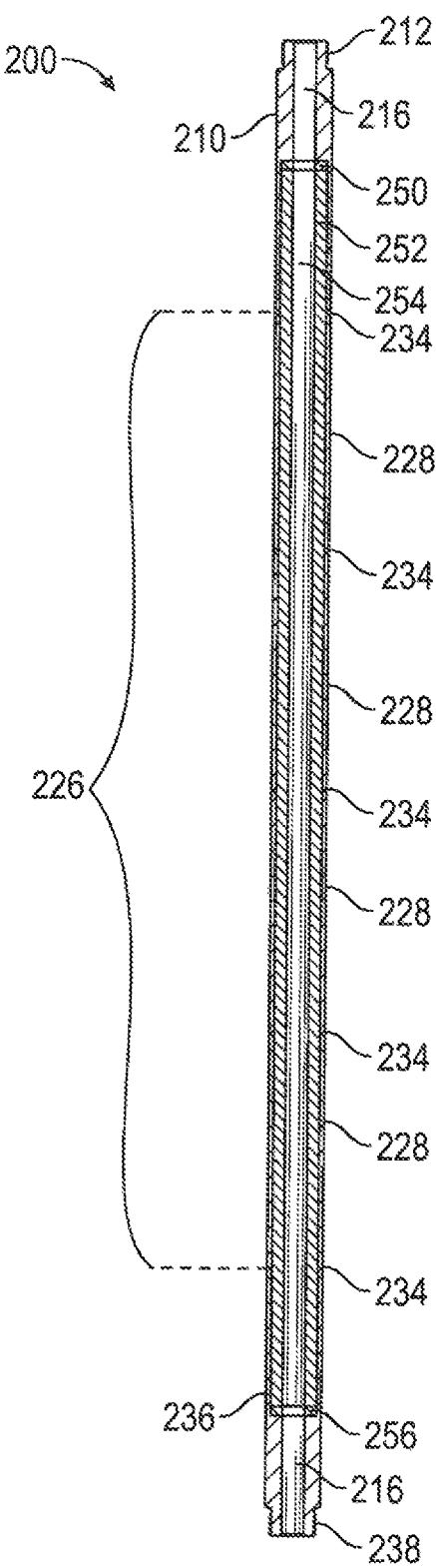
FIG. 19 is a side, cross-sectional view of the jointed plunger assembly of FIG. 17 taken along line A-A.

FIGS. 17-23 show another embodiment of a jointed plunger assembly, hereinafter jointed plunger assembly 200. The jointed plunger assembly 200 is substantially cylindrical and has a center channel 216 (as seen in FIG. 19) formed completely therethrough. The jointed plunger assembly 200 may have a north end cap 210 that is configured to be coupled to a variety of pump components, as discussed further herein. The jointed plunger assembly 200 may also have a south end cap 236 that is configured to be coupled to a variety of pump components, as also discussed further herein. The jointed plunger assembly 200 may also have a body 226 juxtaposed between the north end cap 210 and south end cap 236. The body 226 may have a plurality of joint segments 228. The joint segments 228 are configured to be removably coupled together to form a length of the body 226 of the jointed plunger assembly 200. Although the body 226 in this embodiment is shown as having four joint segments 228, it should be clearly understood that any suitable number of joint segments 228 may be used in order to form jointed plunger assemblies 200 of varying lengths, depending on the conditions and configuration of the particular well in which the jointed plunger assembly 200 is employed.

Figure 20:
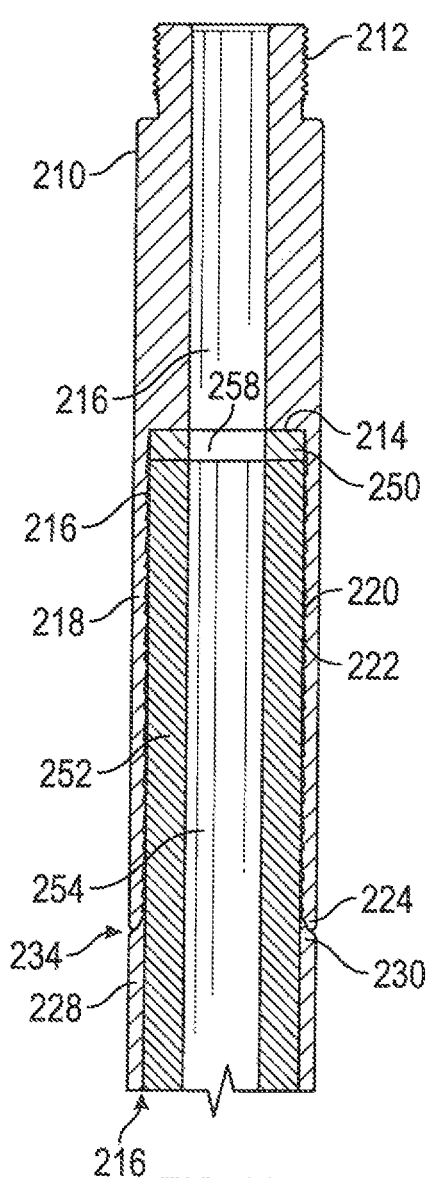
FIG. 20 is a side, cross-sectional view of a northern portion of the jointed plunger assembly of FIG. 17.

Various components of the jointed plunger assembly 200 will now be discussed in further detail. Referring to FIGS. 17-20, the north end cap 210 will be described. The north end cap 210 is cylindrical and has center channel 216 (as seen in FIGS. 19-20) formed completely therethrough. The north end cap 210 may have threading 212 to couple the north end cap 210 to a variety of pump components, such as the cyclone plunger adapter 110, for example, that is shown in FIGS. 7-11. The cyclone plunger adapter 110 may be similar to that disclosed in the above-referenced U.S. Pat. No. 7,713,035. As further examples, the north end cap 210 may be coupled to the southern end of any of various top plunger adapters. Such top plunger adapters may be similar to those disclosed in the above-referenced U.S. Pat. Nos. 7,428,923 and 7,713,035. As another example, the north end cap 210 may be coupled to the southern end of a screen filter assembly. One such screen filter assembly may be similar to that disclosed in the above-referenced U.S. Pat. No. 9,957,782. Another such screen filter assembly may be similar to that disclosed in the above-referenced U.S. patent application Ser. No. 15/939,839. The north end cap 210 may also be coupled to various other pump components, including standard pump components, as may be needed for particular well conditions and configurations. The threading 212 may comprise API plunger threading. While in this embodiment the threading 212 is shown as male (pin) threading, it should be clearly understood that the threading 212 may be male or female (box) threading 212, as long as it engages corresponding male or female threading present on the various pump component to which it may be coupled. The north end cap 212 may further include a south end 224 (as seen in FIG. 20). South end 224 is configured to mate with a north end 230 of joint segment 228, as further described herein. In one embodiment, south end 224 may have an inner diameter that is downwardly tapered, as seen in FIG. 20.

Referring to FIG. 20 and further discussing channel 216, it can be seen that an upper portion of channel 216 in the north end cap 210 may have a diameter that is less than a diameter of a lower portion of channel 216. In this way, the lower portion of channel 216 is configured to receive a plug 250 and an upper portion of a flex rod 252, as further described herein. Further discussing the interior of the north end cap 210, north end cap 210 may further comprise a shoulder 214 and a ridged region 218 formed in the lower portion of channel 216. Shoulder 214 is configured to make contact with an upper surface of plug 250, as described more fully herein. Ridged region 218, which runs from shoulder 214 to south end 224, may be comprised of a plurality of ridges 220 and 222. Ridged region 218 may be back cut, such that each ridge 220 may be outwardly and downwardly angled, while each ridge 222 may be inwardly and downwardly angled. Further, each ridge 220 may have a length that is greater than a length of each ridge 222. In this way, ridges 220 and 222 form an angled or hooked configuration and are designed to grip an adhesive material that may be applied to the north end cap 210, as further described herein. In one embodiment, ridges 220 may be comprised of varying lengths, with each ridge 220 having a length that is greater than a length of each ridge 222. In one embodiment, ridged region 218 may further include milled slots or ports to allow for the adhesive material to fill in between the ridges 222.

Figure 21:
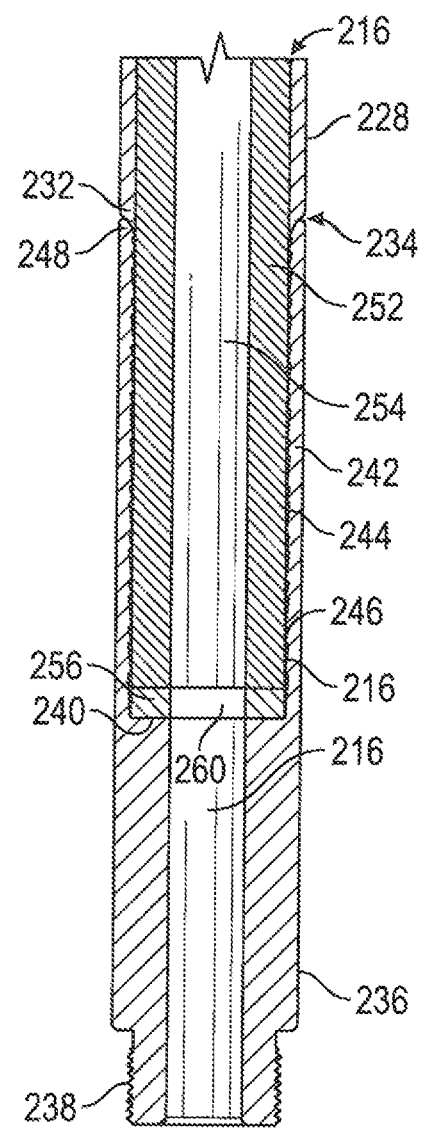
FIG. 21 is a side, cross-sectional view of a southern portion of the jointed plunger assembly of FIG. 17.

Referring to FIGS. 17-19, the body 226 may have a plurality of joint segments 228 and joints 234. Each joint segment 228 is cylindrical and has a center channel 216 (as seen in FIG. 20, for example) formed completely therethrough. Joint segment 228 may have a north end 230 (FIG. 20) and a south end 232 (FIG. 21). North end 230 may have an outer diameter that is upwardly tapered, as seen in FIG. 20, such that the outer diameter of an uppermost portion of the north end 230 is less than an overall outer diameter of joint segment 228. In this way, north end 230 is configured to mate with the south end 224 of the north end cap 210, where a given joint segment 228 is the northern-most joint segment 228 in the jointed plunger assembly 200. The south end 232 of joint segment 228 may have an inner diameter that is downwardly tapered (similar to the downward taper on the south end 224 of the north end cap 210), such that the inner diameter of a to lowermost portion of the south end 232 is less than an overall inner diameter of joint segment 228. In this way, south end 232 is configured to mate with the north end 230 of an adjacent joint segment 228. Referring to FIG. 21, where a given joint segment 228 is the southern-most joint segment 228 in the jointed plunger assembly 200, the south end 232 may have an outer diameter that is downwardly tapered, such that the outer diameter of a lowermost portion of the southern-most joint segment 228 is less than an overall outer diameter of joint segment 228. In this way, south end 232 of the southern-most joint segment 228 is configured to mate with a north end 248 of south end cap 236. Referring to FIG. 19, center channel 216 of each joint segment 228 is configured to receive a portion of a flex rod 252 therethrough, as discussed further herein.

With respect to the joints 234, each joint 234 is comprised of two corresponding radius ends which, when mated, may be similar to that of a ball joint. Thus, when plated, south end 224 of the north end cap 210 and north end 230 of joint segment 228 form a joint 234. Similarly, when mated, south end 232 of joint segment 228 and north end 248 of south end cap 236 form a joint 234. Further, when adjacent joint segments 228 are mated, south end 232 of joint segment 228 and north end 230 of an adjacent joint segment 228 form a joint 234. While in this embodiment the south end 224 of the north end cap 210 and south end 232 of southern-most joint segment 228 are shown as being downwardly tapered and the north end 230 of northern-most joint segment 228 and north end 248 of south end cap 236 are shown as being upwardly tapered, it should be clearly understood that the tapering on the ends of each component, including intermediate joint segments 228 (i.e. joint segments 228 that are juxtaposed between other joint segments 228) may be reversed, as long as it engages the corresponding tapering present on the component to which it is to be coupled. For example, it would be possible to provide a south end cap 236 having a north end 248 with an outer diameter that is upwardly tapered (similar to the upward taper on the north end 230 of joint segment 228), such that the outer diameter of an uppermost portion of the north end 248 is less than an overall outer diameter of south end cap 236. In this way, north end 248 would be configured to mate with a south end 232 of joint segment 228, wherein south end 232 would have an inner diameter that is downwardly tapered (similar to the downward taper on the south end 224 of the north end cap 210), such that the inner diameter of a lowermost portion of the south end 232 is less than an overall inner diameter of joint segment 228.

As shown in FIGS. 17-19, in one embodiment, the jointed plunger assembly 200 may have four joint segments 228 and five joints 234. However, it should be clearly understood that any suitable number of joint segments 228 and joints 234 may be used, depending on the conditions and configuration of the particular well in which the jointed plunger assembly 200 is employed.

Referring to FIGS. 17-19 and 21, the south end cap 236 of the jointed plunger assembly 200 will be discussed. The south end cap 236 is cylindrical and has center channel 216 (as shown, for example, in FIGS. 19 and 21) formed completely therethrough. The south end cap 236 may have threading 238 to couple the south end cap 236 to a variety of pump components, such as a traveling valve. The threading 238 may comprise API plunger threading. While in this embodiment the threading 238 is shown as male (pin) threading, it should be clearly understood that the threading 238 may be male or female (box) threading 238, as long as it engages corresponding male or female threading present on the various pump component to which it may be coupled. The south end cap 236 may further include a north end 248 (as seen in FIG. 21). North end 248 is configured to mate with south end 232 of joint segment 228, as further described herein. In one embodiment, north end 248 may have an inner diameter that is upwardly tapered, as seen in FIG. 21.

Referring to FIG. 21 and further discussing channel 216, it can be seen that a lower portion of channel 216 in the south end cap 236 may have a diameter that is less than a diameter of an upper portion of channel 216. In this way, the upper portion of channel 216 is configured to receive a plug 256 and a lower portion of flex rod 252, as further described herein. Further discussing the interior of the south end cap 236, south end cap 236 may further comprise a shoulder 240 and a ridged region 242 fainted in the upper portion of channel 216. Shoulder 240 is configured to make contact with a lower surface of plug 256, as described more fully herein. Ridged region 242, which runs from shoulder 240 to north end 248, may be comprised of a plurality of ridges 244 and 246. Ridged region 242 may be back cut, such that each ridge 244 may be inwardly and downwardly angled, while each ridge 246 may be outwardly and downwardly angled. Further, each ridge 244 may have a length that is greater than a length of each ridge 246. In this way, ridges 244 and 246 form an angled or hooked configuration and are designed to grip an adhesive material that may be applied to the south end cap 236, as further described herein. In one embodiment, ridges 244 may be comprised of varying lengths, with each ridge 244 having a length that is greater than a length of each ridge 246. In one embodiment, ridged region 242 may further include milled slots or ports to allow for the adhesive material to fill in between the ridges 246.

Referring now to FIGS. 19-23, in this embodiment, the flex rod 252 comprises a substantially elongated tube having a center channel 254 formed completely therethrough. The flex rod 252 is configured to be positioned within a lower portion of the north end cap 210, through each joint segment 228 and within an upper portion of the south end cap 236 of the jointed plunger assembly 200. Accordingly, an outer diameter of the flex rod 252 may be less than a inner diameter of a lower portion of the north end cap 210, an inner diameter of each joint segment 228, and an inner diameter of an upper portion of the south end cap 236. As shown in FIG. 19, the flex rod 252 may have a length that is slightly less than an overall length of the jointed plunger assembly 200. In this way, the flex rod 252 is configured to be positioned through substantially the entire jointed plunger assembly 200, including through a portion of the north end cap 210, through each joint segment 228, and through a portion of the south end cap 236. The flex rod 252 is capable of flexing when the jointed plunger assembly 200 is in a flexed configuration, similar to the flexed configuration of the jointed plunger assembly 200 shown in FIG. 18, for example. The flex rod 252 may be comprised of a flexible polymer fiber material, such as Fiberglass or carbon fiber material, for example. According to one embodiment, the flex rod 252 may be comprised of a strong, flexible material that has shape memory, such as Nitinol, for example.

Referring to FIG. 19, in one embodiment, the jointed plunger assembly 200 may further include plugs 250 and 256. Plug 250 is configured to be positioned on a northern end of the flex rod 252 and to be positioned within a lower portion of the north end cap 210, such that an upper surface of plug 250 makes contact with shoulder 214. Plug 250 may comprise a circular shape having an outer diameter that is the same as an outer diameter of the flex rod 252 and that is slightly less than an overall interior diameter of ridged region 218 of the north end cap 210. Similarly, plug 256 is configured to be positioned on a southern end of the flex rod 252 and to be positioned within an upper portion of the south end cap 236, such that a lower surface of plug 254 makes contact with shoulder 240. Plug 256 may comprise a circular shape having an outer diameter that is the same as an outer diameter of the flex rod 252 and that is slightly less than an overall interior diameter of ridged region 242 of the south end cap 236. When the jointed plunger assembly 200 is fully assembled and ready for use, plug 250 further includes center channel 258 (as seen in FIG. 20), and plug 256 further includes center channel 260 (as seen in FIG. 21). Referring to FIG. 20, channel 258 is juxtaposed between an upper portion of channel 216 of the north end cap 210 and channel 254 of the flex rod 252, such that channels 216, 258, and 254 form a continuous passageway to permit fluids to pass therethrough. Similarly, and referring to FIG. 21, channel 260 is juxtaposed between a lower portion of channel 216 of the south end cap 236 and channel 254 of the flex rod 252, such that channels 216, 260, and 254 form a continuous passageway to permit fluids to pass therethrough.

During pumping operations, fluid-lifting pressure and friction may exert enough movement on a plunger assembly to result in fluid leakage. Thus, the flex rod 252 of the jointed plunger assembly 200 is configured to seal fluid within the jointed plunger assembly 200, thereby preventing fluid from escaping from the jointed plunger assembly 200, particularly at locations where the individual components, including the north end cap 210, joint segments 228, and south end cap 236, are coupled together. This configuration helps to ensure that all pumped fluid is moved upward and away from the pump.

The north end cap 210, joint segments 236, and south end cap 246 of the jointed plunger assembly 200 may be comprised of steel (such as 316 stainless steel or carbon steel), a nickel alloy, special alloys, brass, or some other suitable material, as may be needed for particular well conditions and configurations. The north end cap 210, joint segments 236, and south end cap 246 of the jointed plunger assembly 200 may be coated, such as with a hard surface spray metal or the like, for increased durability and resistance against wear, and may be ground to finish according to known API plunger specifications.

The jointed plunger assemblies 10, 10', 100, 100', and 200 are capable of pivoting. In various embodiments, the jointed plunger assemblies 10 and 10' are capable of pivoting two degrees at each ball joint 28. Similarly, the jointed plunger assemblies 100 and 100' are capable of pivoting two degrees at each ball joint 128. Further, the jointed plunger assembly 200 is capable of pivoting two degrees at each joint 234. In this way, the jointed plunger assemblies 10, 10', 100, 100', and 200 are able to flex and move in and around any deviations (curves) that may be present in the wellbore, thereby conforming to the contours of the wellbore, and, in turn, the pump barrel. By flexing, the jointed plunger assemblies 10, 10', 100, 100', and 200 can be more easily placed and operated in deviated and horizontal well configurations, compared to typical prior art plungers. In addition, by flexing, the jointed plunger assemblies 10, 10', 100, 100', and 200 are able to self-adjust and move away from pressure points within the wellbore and, in turn, the pump barrel, thereby wearing more evenly, compared to typical prior art plungers. According to one embodiment, such pivoting may occur at approximately every six inches of plunger length.

For example, a 72-inch jointed plunger assembly 10 or jointed plunger assembly 10' may be comprised of twelve joint segments 22, each of which may pivot two degrees at each ball joint 28 therein. This would allow the jointed plunger assembly 10 or jointed plunger assembly 10' to form a twenty-four degree arch. According to one embodiment of the jointed plunger assembly 200, the joints 234 may be spaced approximately six and one-half inches apart. However, the distance between the joints 234 may be less than or greater than six and one-half inches in order to allow for more or less flexing of the jointed plunger assembly 200, depending on the conditions and configuration of the particular well in which the jointed plunger assembly 200 is employed.

The jointed plunger assembly 10 and jointed plunger assembly 10' are further capable of freely rotating 360 degrees or more around each ball joint 28. Similarly, the jointed plunger assembly 100 and jointed plunger assembly 100' are capable of freely rotating 360 degrees or more at each ball joint 128. Further, the jointed plunger assembly 200 is capable of freely rotating 360 degrees or more at each joint 234. This also allows the jointed plunger assemblies 10, 10', 100, 100', and 200 to self-adjust and move away from pressure points within the wellbore and, in turn, the pump barrel, and to wear evenly throughout their lengths.

Further, as previously discussed, the jointed plunger assembly 10 and jointed plunger assembly 10' may be comprised of a number of individual, separable components, including the north end cap 12, joint segments 22, seats 26, ball joints 28, coupler segments 36, and south end cap 42. Similarly, the jointed plunger assembly 100 and jointed plunger assembly 100' may be comprised of a number of individual, separable components, including the north end cap 112, joint segments 122, ball joints 128, ball coupler components 136, adapters 140, south end cap 146, and seals 126. Further, the jointed plunger assembly 200 may be comprised of a number of individual, separable components, including the north end cap 210, joint segments 228, and south end cap 236. Such designs may provide one or more advantages. For example, each of the individual components of the jointed plunger assemblies 10, 10', 100, 100', and 200 may be replaced with new components when they are no longer efficient as a result of wear and use, without having to replace the entire jointed plunger assemblies 10, 10', 100, 100', or 200. Further, the flex rod 48 and seal 52 components of the jointed plunger assembly 10' may also be replaced with new components when they are no longer efficient as a result of wear and use, without having to replace the entire jointed plunger assembly 10'. Similarly, the flex rod 152, seal 154 and spacer 156 components of the jointed plunger assembly 100' may also be replaced with new components when they are no longer efficient as a result of wear and use, without having to replace the entire jointed plunger assembly 100'. Further, the flex rod 252 of the jointed plunger assembly 200 may also be replaced with a new component when it is no longer efficient as a result of wear and use, without having to replace the entire jointed plunger assembly 200. With the components of the jointed plunger assemblies 10, 10', 100, 100', and 200 being replaceable, this is an advantage over typical prior art plungers, which must be discarded and fully replaced when a section thereof is worn, which can be both time consuming and expensive.

Further still, with the jointed plunger assembly 10 and jointed plunger assembly 10' being comprised of a number of individual joint segments 22 and coupler segments 36, fully-assembled jointed plunger assemblies 10 and 10' may be comprised of various lengths by adding or eliminating one or more joint segments 22 and coupler segments 36, as may be needed. Similarly, with the jointed plunger assemblies 100 and 100' being comprised of a number of individual joint segments 122, fully-assembled jointed plunger assemblies 100 or 100' may be comprised of various lengths by adding or eliminating one or more joint segments 122, as may be needed. Further, with the jointed plunger assembly 200 being comprised of a number of individual joint segments 228, fully-assembled jointed plunger assemblies 200 may be comprised of various lengths by adding or eliminating one or more joint segments 228, as may be needed. In this way, jointed plunger assemblies 10, 10', 100, 100', and 200 may be easily customized for particular well conditions and configurations, without requiring the stocking of individual plungers of many different lengths, as would be required with prior art pump plungers.

The jointed plunger assemblies 10, 10', 100, 100', and 200 may be employed in both insert pumps and tubing pumps. With respect to insert pump applications, the jointed plunger assemblies 10, 10', 100, 100', 200 are compatible with standard insert type API pumps, which are not affected by the capability of the jointed plunger assemblies 10, 10', 100, 100', or 200 to rotate 360 degrees.

With respect to tubing pump applications, the jointed plunger assemblies 10, 10', 100, 100', and 200 may be used therein with some modifications. In this regard, when used in tubing pumps, the jointed plunger assembly 10 and jointed plunger assembly 10' will be capable of pivoting two degrees at each ball joint 28 within the pump barrel, as discussed above, but it will be desired to prevent them from rotating 360 degrees at each ball joint 28. Similarly, when used in tubing pumps, the jointed plunger assembly 100 and jointed plunger assembly 100' will be capable of pivoting two degrees at each ball joint 128 within the pump band, as discussed, but it will be desired to prevent them from rotating 360 degrees at each ball joint 128. Further, when used in tubing pumps, the jointed plunger assembly 200 will be capable of pivoting two degrees at each joint 234 within the pump barrel, as discussed, but it will be desired to prevent it from rotating 360 degrees at each joint 234. This is because, unlike standard insert type API pumps, tubing style API pumps often include a retrievable standing valve and/or on/off tool, which allows the sucker rod string to be retrieved without retrieving the standing valve. The design of standard tubing style API pumps requires the rod string to be lowered until the plunger section, which would have a traveling valve with a clutched seat plug coupled to the south end of the plunger, reaches the standing valve, where the clutched seat plug engages with the standing valve. To retrieve the standing, valve or sucker rod string, the rod assembly would be rotated to turn in a right direction. This would allow the standing valve to be retrieved or, alternatively, the on/off tool to disengage, thereby allowing the sucker rod string to be retrieved. In order to prevent the jointed plunger assembly 10 and jointed plunger assembly 10' from rotating in a tubing pump application, the jointed plunger assembly 10 and jointed plunger assembly 10' may further include an optional standard clutch assembly incorporated into each joint segment 22, as may be needed. The clutch assembly may include a set of ears that would lock the jointed plunger assembly 10 and jointed plunger assembly 10' in place proximate each ball joint 28 and prevent the jointed plunger assembly 10 and jointed plunger assembly 10' from rotating 360 degrees. This still allows the jointed plunger assembly 10 and jointed plunger assembly 10' to pivot two degrees at each ball joint 28, but does not allow rotation at each ball joint 28, as the joint segments 22 will be clutched to form a jointed plunger assembly 10 or jointed plunger assembly 10' that is one continuous unit. Similarly, in order to prevent the jointed plunger assembly 100 and jointed plunger assembly 100' from rotating in a tubing pump application, the jointed plunger assembly 100 and jointed plunger assembly 100' may further include an optional standard clutch assembly incorporated into each joint segment 122, as may be needed. The clutch assembly may include a set of ears that would lock the jointed plunger assembly 100 and jointed plunger assembly 100' in place proximate each ball joint 128 and prevent the jointed plunger assembly 100 and jointed plunger assembly 100' from rotating 360 degrees. This still allows the jointed plunger assembly 100 and jointed plunger assembly 100' to pivot two degrees at each ball joint 128, but does not allow rotation at each ball joint 128, as the joint segments 122 will be clutched to form a jointed plunger assembly 100 or jointed plunger assembly 100' that is one continuous unit. Further, in order to prevent the jointed plunger assembly 200 from rotating in a tubing pump application, the jointed plunger assembly 200 may further include an optional standard clutch assembly incorporated into each joint segment 228, as may be needed. The clutch assembly may include a set of ears that would lock the jointed plunger assembly 200 in place proximate each joint 234 and prevent the jointed plunger assembly 200 from rotating 360 degrees. This still allows the jointed plunger assembly 200 to pivot two degrees at each joint 234, but does not allow rotation at each joint 234, as the joint segments 228 will be clutched to form a jointed plunger assembly 200 that is one continuous unit.

The jointed plunger assemblies 10, 10', 100, 100', and 200 may be further customized in various ways, as may be needed for particular well conditions and configurations. For example, in, one embodiment, the jointed plunger assemblies 10, 10', 100, 100', and 200 may be equipped with a screen filter similar to that disclosed in the above-referenced U.S. patent application Ser. No. 15/939,839. As another example, the jointed plunger assemblies 10 and 10' may include grooves formed around an outer diameter of one or more of the following: joint segments 22, coupler segments 36, north end cap 12, and/or south end cap 42. Similarly, the jointed plunger assemblies 100 and 100' may include grooves formed around an outer diameter of one or more of the following: joint segments 122, north end cap 112, and/or south end cap 146. Further, the jointed plunger assembly 200 may include grooves formed around an outer diameter of one or more of the following: joint segments 228, north end cap 210, and/or south end cap 236. In one or more embodiments, the grooves may be adapted to receive seal rings. In another embodiment or embodiments, the grooves may comprise shallow grooves, adapting the jointed plunger assemblies 10, 10', 100, 100', and 200 for use in wells having sandy conditions. As yet another example, the jointed plunger assemblies 10, 10', 100, 100', and 200 may include a cyclone section, such as a cyclone plunger adapter, as referenced above.

Statement of Operation

To use the jointed plunger assembly 10 and jointed plunger assembly 10', a pump operator (or other suitable person) would assemble all of the components of the jointed plunger assembly 10 or jointed plunger assembly 10', including a desired number of joint segments 22 and coupler segments 36, and corresponding number of ball joints 28, as may be needed depending on the conditions and configuration of a given well. The north end cap 12 would be coupled to the northern-most joint segment 22, while the south end cap 42 would be coupled to the southern-most joint segment 22. The jointed plunger assembly 10 or jointed plunger assembly 10' would then be coupled, directly or indirectly, to a sucker rod, so that the jointed plunger assembly 10 or jointed plunger assembly 10' will move northward during the upstroke of the pumping unit, and southward with the downstroke of the pumping unit.

When assembled, each joint segment 22 of the jointed plunger assembly 10 and jointed plunger assembly 10' hinges around the ball 34 of the ball joint 28. In this way, the jointed plunger assembly 10 and jointed plunger assembly 10' are capable of pivoting two degrees at each ball joint 28 within each joint segment 22. An example of such pivoting, can be seen in FIG. 2, where the jointed plunger assembly 10 is shown in a flexed configuration. When flexed, the jointed plunger assembly 10 and jointed plunger assembly 10' may be in a curved configuration that deviates from a straight line, as shown in FIG. 2, for example. Thus, when lowered into a wellbore having an angled or curved configuration, the jointed plunger assembly 10 and jointed plunger assembly 10' are capable of flexing in various directions to follow the contours of the wellbore and, in turn, the particular pump barrel. For example, where the wellbore is curved, the jointed plunger assembly 10 and jointed plunger assembly 10' are able to flex along their entire lengths within the curve. In this way, the jointed plunger assembly 10 and jointed plunger assembly 10' are more easily placed in wells having horizontal configurations, as compared to typical prior art plungers.

To use the jointed plunger assembly 100 and jointed plunger assembly 100', a pump operator (or other suitable person) would assemble all of the components of the jointed plunger assembly 100 or jointed plunger assembly 100', including a desired number of joint segments 122 and corresponding number of ball joints 128, ball coupler components 136, and adapters 140, as may be needed depending on the conditions and configuration of a given well. The north end cap 112 would be coupled to the northern-most joint segment 122, while the south end cap 146 would be coupled to the southern-most joint segment 122. The jointed plunger assembly 100 or jointed plunger assembly 100' would then be coupled, directly or indirectly, to a sucker rod, so that the jointed plunger assembly 100 or jointed plunger assembly 100' will move northward during the upstroke of the pumping unit, and southward with the downstroke of the pumping unit.

Figures 13, 14:
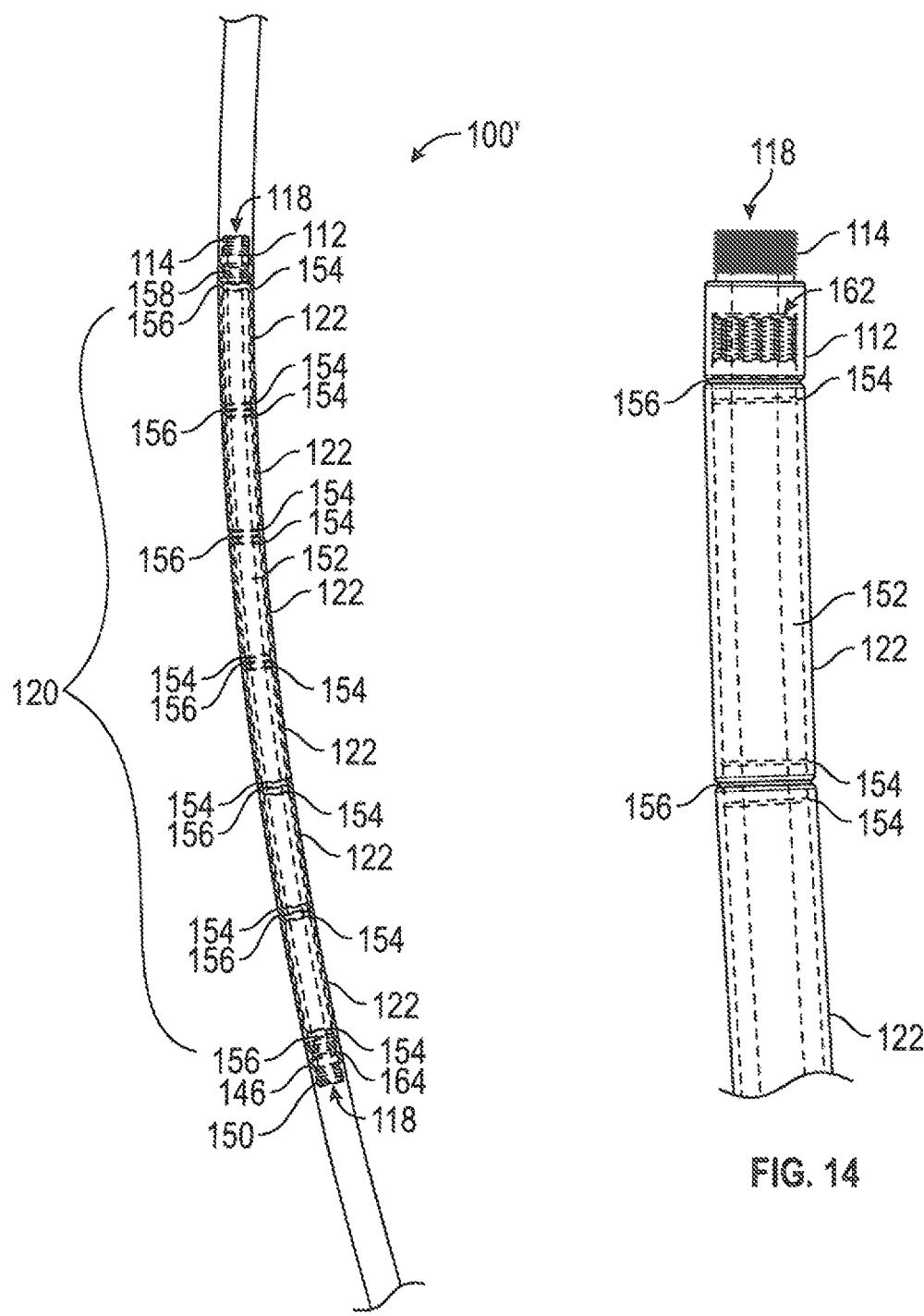
FIG. 13 is a side view of another embodiment of a jointed plunger assembly, illustrating an optional flex rod positioned therein, in accordance with one or more aspects of the present invention.
FIG. 14 is a side view of a northern portion of the jointed plunger assembly of FIG. 13.

When assembled, each joint segment 122 of the jointed plunger assembly 100 and jointed plunger assembly 100' hinges around the ball 134 of the ball joint 128. In this way, the jointed plunger assembly 100 and jointed plunger assembly 100' are capable of pivoting two degrees at each ball joint 128 within each joint segment 122. An example of such pivoting can be seen in FIGS. 8 and 13, where the jointed plunger assembly 100 and jointed plunger assembly 100', respectively, are shown in flexed configurations. When flexed, the jointed plunger assembly 100 and jointed plunger assembly 100' may be in a curved configuration that deviates from a straight line, as shown in FIGS. 8 and 13, for example. Thus, when lowered into a wellbore having an angled or curved configuration, the jointed plunger assembly 100 and jointed plunger assembly 100' are capable of flexing in various directions to follow the contours of the wellbore and, in turn, the particular pump barrel. For example, where the wellbore is curved, the jointed plunger assembly 100 and jointed plunger assembly 100' are able to flex along their entire lengths within the curve. In this way, similar to the jointed plunger assemblies 10 and 10', the jointed plunger assemblies 100 and 100' are more easily placed in wells having horizontal configurations, as compared to typical prior art plungers.

Figure 22:
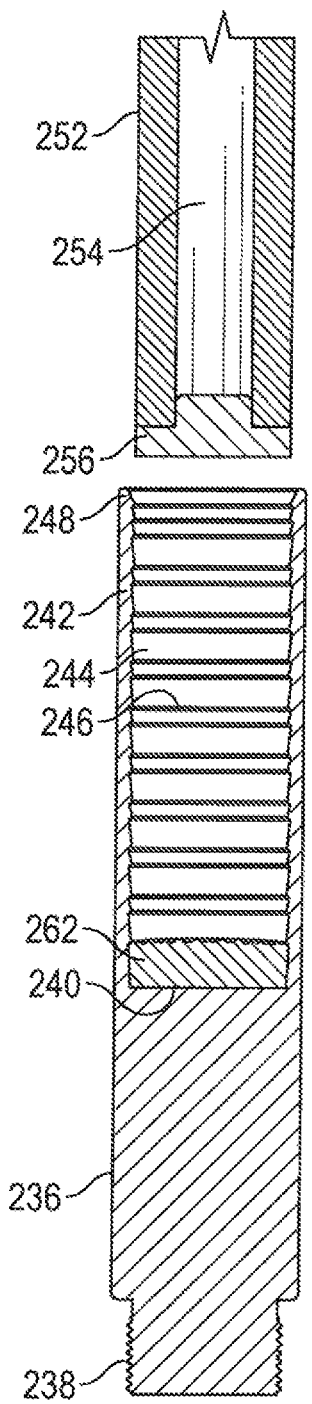
FIG. 22 is a side, cut-away view of a southern portion of the jointed plunger assembly of FIG. 17 illustrating positioning of a flex rod and plug therein in accordance with one or more aspects of the present invention.
Figure 23:
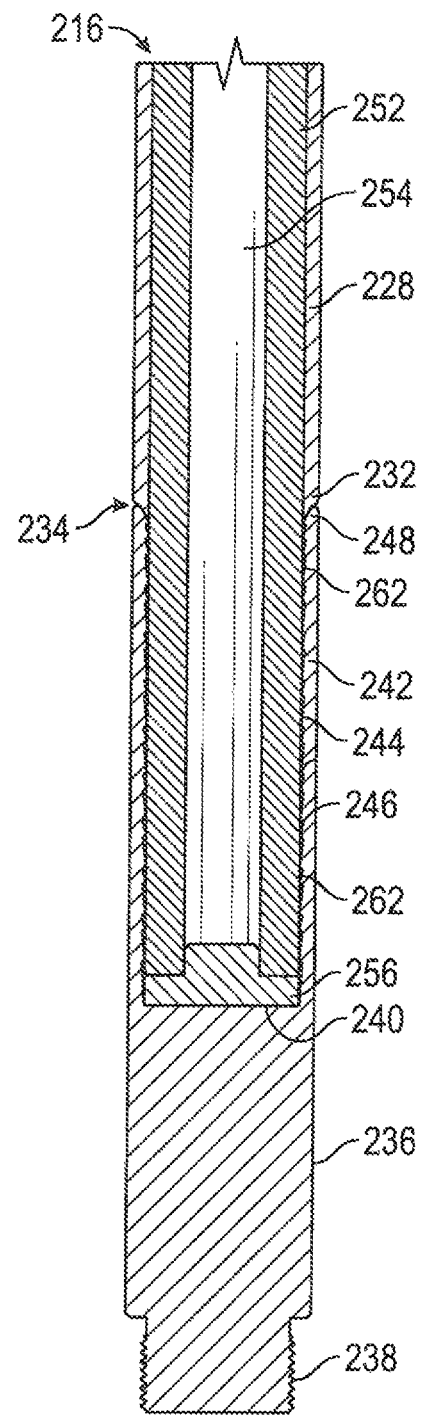
FIG. 23 is a side, cut-away view of the portion of the jointed plunger assembly of FIG. 22, illustrating a flex rod and plug positioned there.

To use the jointed plunger assembly 200, a pump operator (or other suitable person) would assemble all of the components of the jointed plunger assembly 200. Referring now to FIGS. 22-23, assembling the jointed plunger assembly 200 may commence with injecting an adhesive material 262 into ridged region 242 of the south end cap 236, such that the adhesive material 262 is permitted to collect in a portion of ridged region 242 at shoulder 240. The adhesive material 262 may be an industrial epoxy or some other suitable material capable of binding the flex rod 252 to the south end cap 236 and north end cap 210, as further described herein. Plug 256 would be positioned on the southern end of flex rod 252 at this time. As seen in this embodiment, at the time of assembly, plug 256 may include a middle portion that protrudes into an end portion of channel 254. In this way, plug 256 is configured to seal center channel 254, preventing the adhesive material 262 from entering channel 254 when the flex rod 252 is positioned in the south end cap 236, as further described herein. After adhesive material 262 has been applied, the southern end of flex rod 252, fitted with plug 256, would then be coupled to the south end cap 236 by pushing/press-fitting flex rod 252 into ridged region 242 until the lower surface of plug 256 comes to rest on shoulder 240. As flex rod 252 is positioned in this manner, this forces the adhesive material 262 to move in the opposite direction, causing it to fill in ridges 244 and 246 throughout ridged region 242. As described above, the configuration of ridges 244 and 246 is such that each ridge 244 may have a length that is greater than a length of each ridge 246. With this configuration, the flex rod 252 proceeds along relatively longer ridges 244 and less resistance relative to installation of the flex rod 252 in the south end cap 236, and relatively shorter ridges 246 and increased resistance relative to removal of the flex rod 252. This configuration of ridges 244 and 246 helps to facilitate installation of the flex rod 252 in the ridged region 242 while helping to prevent the flex rod 252 from self-ejecting from the ridged region 242. The adhesive material 262 binds the flex rod 252 to the south end cap 236. This creates a seal between the flex rod 252 exterior and south end cap 236 interior along ridged region 242, thereby preventing fluid leakage, and helping to ensure that all pumped fluid is moved upward and away from the pump.

It should be noted that prior to assembly, only the upper portion of channel 216 of the south end cap 236 is present, with the lower portion of channel 216 (as seen in FIG. 21) to be drilled out after the adhesive material 262 has cured, as further described herein.

After fitting the flex rod 252 into the south end cap 236, a desired number of joint segments 228 (as may be needed depending on the conditions and configuration of a given well) would then be installed on the flex rod 252. Beginning with a southern-most joint segment 228, each joint segment 228 would be pressed onto the flex rod 252, such that flex rod 252 is positioned within the center channel 216 of each joint segment 228. As each joint segment 228 is placed into position, this causes the flex rod 252 to go into a compressive state, which creates a seal between the flex rod 252 exterior and each joint segment 228 interior, thereby preventing fluid leakage, and helping to ensure that all pumped fluid is moved upward and away from the pump.

Once the northern-most joint segment 228 has been installed on the flex rod 252, adhesive material 262 may be injected into ridged region 218 of the north end cap 210, such that the adhesive material 262 is permitted to collect in a portion of ridged region 218 at shoulder 214. Plug 250 would be positioned on the northern end of flex rod 252 at this time. As with plug 256, at the time of assembly, plug 250 may include a middle portion that protrudes into an end portion of channel 254. In this way, plug 250 is configured to seal center channel 254, preventing the adhesive material 262 from entering channel 254 when the flex rod 252 is positioned in the north end cap 210, as further described herein. After adhesive material 262 has been applied, the northern end of flex rod 252, fitted with plug 250, would then be coupled to the north end cap 210 by pushing/press-fitting flex rod 252 into ridged region 218 until the upper surface of plug 250 comes to rest on shoulder 214. As flex rod 252 is positioned in this manner, this forces the adhesive material 262 to move in the opposite direction, causing it to fill ridges 220 and 222 throughout ridged region 218. As described above, the configuration of ridges 220 and 222 is such that each ridge 220 may have a length that is greater than a length of each ridge 222. With this configuration, the flex rod 252 proceeds along relatively longer ridges 220 and less resistance relative to installation of the flex rod 252 in the north end cap 210, and relatively shorter ridges 222 and increased resistance relative to removal of the flex rod 252. This configuration of ridges 220 and 222 helps to facilitate installation of the flex rod 252 in the ridged region 218 while helping to prevent the flex rod 252 from self-ejecting from the ridged region 218. The adhesive material 262 binds the flex rod 252 to the north end cap 210, in the same manner that the adhesive material 262 binds the flex rod 252 to the south end cap 236. This creates a seal between the flex rod 252 exterior and north end cap 210 interior along ridged region 218, thereby preventing fluid leakage, and helping to ensure that all pumped fluid is moved upward and away from the pump.

It should be noted that, similar to the south end cap 236, prior to assembly, only the lower portion of channel 216 of the north end cap 210 is present, with the upper portion of channel 216 (as seen in FIG. 20) to be drilled out after the adhesive material 262 has cured, as further described herein.

After fitting the flex rod 252 into the north end cap 210, the adhesive material 262 would be allowed to cure. After curing, the upper portion of north end cap 210 would be drilled to form upper portion of center channel 216 of the north end cap 210 and center channel 258 of the flex rod 252. Further, the lower portion of south end cap 236 would be drilled to form lower portion of center channel 216 of the south end cap 236 and center channel 260 of the flex rod 252. Once drilled, upper portion of center channel 216 of the north end cap 210, center channel 258, center channel 254, center channel 260, and lower portion of center channel 216 of the south end cap 236 form a continuous passageway (as can be seen from a review of FIGS. 19-21) to permit the fluids to pass therethrough.

The jointed plunger assembly 200 would then be coupled, directly or indirectly, to a sucker rod, so that the jointed plunger assembly 200 will move northward during the upstroke of the pumping unit, and southward with the downstroke of the pumping unit.

While assembling the jointed plunger assembly 200 has been described as starting with the south end cap 236 and working northward, it should be clearly understood that the manner of assembling the components of the jointed plunger assembly 200 is not restricted to this to order and can start with the north end cap 210 and work southward, for example.

When assembled, each joint segment 228 of the jointed plunger assembly 200 hinges at each joint 234. In this way, the body 226 of the jointed plunger assembly 200 is capable of pivoting or flexing two degrees at each joint 234. An example of such pivoting or flexing can be seen in FIG. 18, where the jointed plunger assembly 200 is shown in a flexed configuration. When flexed, the jointed plunger assembly 200 may be in a curved configuration that deviates from a straight line, as shown in FIG. 18, for example. Thus, when lowered into a wellbore having an angled or curved configuration, the jointed plunger assembly 200 is capable of flexing in various directions to follow the contours of the wellbore and, in turn, the particular pump barrel. For example, where the wellbore is curved, the jointed plunger assembly 200 is able to flex along its entire length within the curve. In this way, similar to the jointed plunger assemblies 10, 10', 100, and 100', the jointed plunger assembly 200 is more easily placed in wells having horizontal configurations, as compared to typical prior art plungers.

During pumping operations, as with a prior art system, fluid will be pumped from a hole through a series of downstrokes and upstrokes of the pump, which motion is imparted by the above-ground pumping unit. During pumping operations, the jointed plunger assemblies 10, 10', 100, 100', and 200 are capable of flexing in various directions to follow the contours of the particular pump barrel that is placed in an angled or curved configuration. For example, as previously noted, the jointed plunger assemblies 10, 10', 100, 100', and 200 are able to flex along their entire lengths within the curve. In this way, the jointed plunger assemblies 10, 10', 100, 100', and 200 are more easily operated in pump barrels that are placed in an angled or curved configuration, as compared to typical prior art plungers that are rigid. Such typical prior art plungers frequently come into contact with the pump barrel at various pressure points as the pump moves up and down. This causes both premature wear and uneven wear to the plunger, resulting in shorter plunger life. Conversely, by flexing, the jointed plunger assemblies 10, 10', 100, 100', and 200 are able to self-adjust and move away from pressure points where they may come into contact with the pump barrel as the pump moves up and down. This helps the jointed plunger assemblies 10, 10', 100, 100', and 200 to wear more evenly compared to typical prior art plungers, thereby providing longer plunger life. Moreover, in insert pump applications, the jointed plunger assemblies 10 and 10' are further able to freely rotate 360 degrees or more around each ball joint 28. Similarly, in insert pump applications, the jointed plunger assemblies 100 and 100' are further able to freely rotate 360 degrees or more around each ball joint 128. Further, in insert pump applications, the jointed plunger assembly 200 is further able to freely rotate 360 degrees or more around each joint 234. This allows the jointed plunger assemblies 10, 10', 100, 100', and 200 to self-adjust and move away from pressure points, within the pump barrel in a lateral direction as well, and to further wear more evenly, providing yet longer plunger life.

The foregoing description is illustrative of particular embodiments of the invention, but is not meant to be a limitation upon the practice thereof. While embodiments of the disclosure have been described in terms of various specific embodiments, those skilled in the art will recognize that the embodiments of the disclosure may be practiced with modifications without departing from the spirit and scope of the invention.

I claim:

1. A jointed plunger assembly for a pumping apparatus comprising, in combination:

a north end cap having a channel formed therethrough;
a south end cap having a channel formed therethrough;
a body interposed between the north end cap and the south end cap, the body comprising at least one joint segment and a plurality of joints;
wherein the at least one joint segment has a north end and a south end and a channel formed therethrough;
wherein the plurality of joints comprises at least a first joint formed between the north end cap and the at least one joint segment, and a second joint formed between the south end cap and the at least one joint segment;
wherein the body is configured to flex at each joint of the plurality of joints so that the jointed plunger assembly can be alternately positioned in a straight configuration and a curved configuration; and
a flex rod having a north end and a south end and a channel formed therethrough;
wherein the flex rod is configured to be positioned in the north end cap, the body, and the south end cap.

2. The jointed plunger assembly of claim 1 wherein the body comprises:
a plurality of joint segments, the plurality of joint segments comprising at least a northern-most joint segment and a southern-most joint segment;
wherein an outer diameter at a north end of the northern-most joint segment is upwardly tapered; and
wherein an outer diameter at a south end of the southern-most joint segment is downwardly tapered.

3. The jointed plunger assembly of claim 2 wherein the plurality of joints further comprises at least a third joint formed between adjacent joint segments.

4. The jointed plunger assembly of claim 2 wherein the plurality of joint segments further comprises at least one intermediate joint segment interposed between the northern-most joint segment and the southern-most joint segment.

5. The jointed plunger assembly of claim 4 wherein an inner diameter at a south end of the at least one intermediate joint segment is downwardly tapered.

6. A jointed plunger assembly for a pumping apparatus comprising, in combination:
a north end cap having a channel formed therethrough, the north end cap further comprising:
a north end;
a shoulder;
a south end, wherein an interior diameter at the south end is downwardly tapered; and
a ridged region formed between the shoulder and the south end, the ridged region having a plurality of ridges, and the ridged region configured to receive an upper portion of a flex rod;
a south end cap having a channel formed therethrough;
a body interposed between the north end cap and the south end cap, the body comprising at least one joint segment and a plurality of joints;
wherein the at least one joint segment has a north end and a south end and a channel formed therethrough;
wherein the plurality of joints comprises at least a first joint formed between the north end cap and the at least one joint segment, and a second joint formed between the south end cap and the at least one joint segment;
wherein the body is configured to flex at each joint of the plurality of joints; and
a flex rod having a north end and a south end and a channel formed therethrough;
wherein the flex rod is configured to be positioned in the north end cap, the body, and the south end cap.

7. The jointed plunger assembly of claim 6 further comprising a plug positioned between the shoulder of the north end cap and the north end of the flex rod.

8. The jointed plunger assembly of claim 6 further comprising an adhesive material positioned in the ridged region.

9. A jointed plunger assembly for a pumping apparatus comprising, in combination:
a north end cap having a channel formed therethrough;
a south end cap having a channel formed therethrough, the south end cap further comprising:
a south end;
a shoulder;
a north end, wherein an interior diameter at the north end is upwardly tapered; and
a ridged region formed between the shoulder and the north end, the ridged region having a plurality of ridges, and the ridged region configured to receive a lower portion of a flex rod;
a body interposed between the north end cap and the south end cap, the body comprising at least one joint segment and a plurality of joints;
wherein the at least one joint segment has a north end and a south end and a channel formed therethrough;
wherein the plurality of joints comprises at least a first joint formed between the north end cap and the at least one joint segment, and a second joint formed between the south end cap and the at least one joint segment;
wherein the body is configured to flex at each joint of the plurality of joints; and
a flex rod having a north end and a south end and a channel formed therethrough;
wherein the flex rod is configured to be positioned in the north end cap, the body, and the south end cap.

10. The jointed plunger assembly of claim 9 further comprising a plug positioned between the shoulder of the south end cap and the south end of the flex rod.

11. The jointed plunger assembly of claim 9 further comprising an adhesive material positioned in the ridged region.

12. A jointed plunger assembly for a pumping apparatus comprising, in combination:
a north end cap comprising:
a north end;
a shoulder;
a south end, wherein an interior diameter at the south end is downwardly tapered;
a channel formed from the north end through the south end; and
a ridged region formed between the shoulder and the south end, the ridged region having a plurality of ridges, and the ridged region configured to receive an upper portion of a flex rod;
a south end cap comprising:
a north end, wherein an interior diameter at the north end is upwardly tapered;
a shoulder;
a south end;
a channel formed from the south end through the north end; and
a ridged region formed between the shoulder and the north end, the ridged region having a plurality of ridges, and the ridged region configured to receive a lower portion of a flex rod;
a body interposed between the north end cap and the south end cap, the body comprising a plurality of joint segments and a plurality of joints;

wherein each of the plurality of joint segments has a north end and a south end and a channel formed therethrough;

wherein the plurality of joints comprises at least a first joint formed between the north end cap and a northern-most joint segment, a second joint formed between the south end cap and a southern-most joint segment, and a third joint formed between adjacent joint segments;

wherein the body is configured to flex at each joint of the plurality of joints; and a flex rod having a north end and a south end and a channel formed therethrough;

wherein the flex rod is configured to be positioned in the north end cap, the body, and the south end cap.

13. The jointed plunger assembly of claim 12 further comprising a first plug positioned between the shoulder of the north end cap and the north end of the flex rod and a second plug positioned between the shoulder of the south end cap and the south end of the flex rod.

14. The jointed plunger assembly of claim 12 further comprising an adhesive material positioned in the ridged region of the north end cap and in the ridged region of the south end cap.

15. The jointed plunger assembly of claim 12 wherein an outer diameter at the north end of the northern-most joint segment is upwardly tapered, an outer diameter at the south end of the southern-most joint segment is downwardly tapered, and an inner diameter at the south end of an intermediate joint segment is downwardly tapered.

16. A method for pumping fluid comprising the steps of:
providing a jointed plunger assembly for a pumping apparatus comprising, in combination:
  a north end cap having a channel formed therethrough;
  a south end cap having a channel formed therethrough;
  a body interposed between the north end cap and the south end cap, the body comprising at least one joint segment and a plurality of joints;
  wherein the at least one joint segment has a north end and a south end and a channel formed therethrough;
  wherein the plurality of joints comprises at least a first joint formed between the north end cap and the at least one joint segment, and a second joint formed between the south end cap and the at least one joint segment;
  wherein the body is configured to flex at each joint of the plurality of joints so that the jointed plunger assembly can be alternately positioned in a straight configuration and a curved configuration; and
  a flex rod having a north end and a south end and a channel formed therethrough;
  wherein the flex rod is configured to be positioned in the north end cap, the body, and the south end cap;
positioning the jointed plunger assembly in the pumping apparatus so that the jointed plunger assembly will move northward during the upstroke of the pumping apparatus, and southward with the downstroke of the pumping apparatus; and
utilizing the jointed plunger assembly, pumping fluid.

17. The method of claim 16 further comprising:
wherein the north end cap further comprises:
  a north end;
  a shoulder;
  a south end, wherein an interior diameter at the south end is downwardly tapered; and
  a ridged region formed between the shoulder and the south end, the ridged region having a plurality of ridges, and the ridged region configured to receive an upper portion of the flex rod;
wherein the south end cap further comprises:
  a south end;
  a shoulder;
  a north end, wherein an interior diameter at the north end is upwardly tapered; and
  a ridged region formed between the shoulder and the north end, the ridged region having a plurality of ridges, and the ridged region configured to receive a lower portion of the flex rod; and
wherein the body comprises:
  a plurality of joint segments, the plurality of joint segments comprising at least a northern-most joint segment and a southern-most joint segment;
  wherein an outer diameter at the north end of the northern-most joint segment is upwardly tapered; and
  wherein an outer diameter at the south end of the southern-most joint segment is downwardly tapered.

18. The method of claim 16 further comprising the step of utilizing the jointed plunger assembly in a deviated drilling operation.

19. The method of claim 16 further comprising the step of permitting the jointed plunger assembly to flex so that the jointed plunger assembly follows the contours of a wellbore.

20. The method of claim 16 further comprising the step of permitting the jointed plunger assembly to self-adjust and move away from pressure points within a pump barrel.

* * * * *